United States Patent
Rosenzweig et al.

(10) Patent No.: US 9,811,355 B2
(45) Date of Patent: Nov. 7, 2017

(54) METHOD AND APPARATUS FOR SELECTING AN INTERCONNECT FREQUENCY IN A COMPUTING SYSTEM

(71) Applicant: Intel Corporation, Santa Clara, CA (US)

(72) Inventors: Nir Rosenzweig, Givat Ella (IL); Efraim Rotem, Haifa (IL); Doron Rajwan, Rishon Le-Zion (IL); Nadav Shulman, Tel Mond (IL); Eliezer Weissmann, Haifa (IL)

(73) Assignee: Intel Corporation, Santa Clara, CA (US)

( * ) Notice: Subject to any disclaimer, the term of this patent is extended or adjusted under 35 U.S.C. 154(b) by 516 days.

(21) Appl. No.: 14/338,692

(22) Filed: Jul. 23, 2014

(65) Prior Publication Data

US 2016/0026479 A1    Jan. 28, 2016

(51) Int. Cl.
    *G06F 1/32*    (2006.01)
    *G06F 9/445*    (2006.01)
    (Continued)

(52) U.S. Cl.
    CPC ...... *G06F 9/44505* (2013.01); *G06F 12/0844* (2013.01); *G06F 13/4234* (2013.01);
    (Continued)

(58) Field of Classification Search
    CPC ... G06F 1/324; Y02B 60/1217; G05B 23/024; G06K 9/6278; G06K 9/6296; H04N 21/4663
    See application file for complete search history.

(56) References Cited

U.S. PATENT DOCUMENTS

| 7,739,524 | B2 * | 6/2010 | Mangione-Smith .. G06F 1/3203 |
| | | | 713/300 |
| 7,770,034 | B2 * | 8/2010 | Nanja ................... G06F 1/3203 |
| | | | 713/300 |

(Continued)

FOREIGN PATENT DOCUMENTS

WO    WO2013137682    9/2013

OTHER PUBLICATIONS

Texas Instruments—"OMAP 4460 Multimedia Device—Data Manual"; Dated Jan. 2012, 445 Pages.*

(Continued)

*Primary Examiner* — Brian Misiura
(74) *Attorney, Agent, or Firm* — Trop, Pruner & Hu, P.C.

(57) ABSTRACT

In an embodiment, a processor includes at least one core and an interconnect that couples the at least one core and the cache memory. The interconnect is to operate at an interconnect frequency ($f_{CL}$). The processor also includes a power management unit (PMU) including $f_{CL}$ logic to determine whether to adjust the $f_{CL}$ responsive to a Bayesian prediction value that is associated with scalability of a workload to be processed by the processor. The Bayesian prediction value may be determined based on one or more activity measures associated with the processor. Other embodiments are described and claimed.

20 Claims, 20 Drawing Sheets

(51) Int. Cl.
*G06F 12/0844* (2016.01)
*G06F 13/42* (2006.01)

(52) U.S. Cl.
CPC ........ *G06F 1/324* (2013.01); *G06F 2212/604* (2013.01); *Y02B 60/1228* (2013.01); *Y02B 60/1235* (2013.01)

(56) References Cited

U.S. PATENT DOCUMENTS

| | | | | |
|---|---|---|---|---|
| 7,814,485 B2* | 10/2010 | Morgan | ................ | G06F 1/3228 713/323 |
| 8,621,253 B1* | 12/2013 | Brown | .................... | G06F 1/324 348/500 |
| 8,639,862 B2* | 1/2014 | Bouvier | ................ | G06F 1/3206 710/52 |
| 8,775,839 B2* | 7/2014 | Cousson | ............... | G06F 1/3203 713/322 |
| 8,917,733 B2* | 12/2014 | Jim | ..................... | H04W 52/029 370/395.7 |
| 8,984,313 B2* | 3/2015 | Bhandaru | ................. | G06F 1/26 713/300 |
| 9,064,050 B2* | 6/2015 | Duroiu | .................. | G06F 13/362 |
| 9,152,214 B2* | 10/2015 | Thumma | ................ | G06F 1/324 |
| 9,348,401 B2* | 5/2016 | Weissmann | ............. | G06F 1/324 |
| 2010/0162037 A1* | 6/2010 | Maule | ................... | G06F 11/106 714/5.11 |
| 2013/0159741 A1* | 6/2013 | Schluessler | ........... | G06F 1/3253 713/320 |
| 2013/0262792 A1* | 10/2013 | Barth, Jr. | .............. | G06F 1/3275 711/154 |
| 2014/0068290 A1 | 3/2014 | Bhandaru | | |
| 2015/0106649 A1* | 4/2015 | Kannan | ..................... | G06F 1/08 713/501 |
| 2016/0048181 A1* | 2/2016 | Rosenzweig | ........... | G06F 1/206 713/322 |
| 2016/0070321 A1* | 3/2016 | Shapira | ..................... | G06F 1/26 713/300 |

OTHER PUBLICATIONS

Contreras et al., "Power prediction for Intel XScale processors using performance monitoring unit events," Proceedings of the 2005 International Symposium on Low Power Electronics and Design, Aug. 2005, pp. 221-226.*
United States Patent and Trademark Office "Utility Patent Application" U.S. Appl. No. 13/793,684, filed Mar. 11, 2013.
United States Patent and Trademark Office "Utility Patent Application" U.S. Appl. No. 14/092,034, filed Nov. 27, 2013.

* cited by examiner

METHOD AND APPARATUS FOR SELECTING AN INTERCONNECT FREQUENCY IN A COMPUTING SYSTEM

TECHNICAL FIELD

Embodiments pertain to selection of an interconnect frequency in a computing system.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

In a processor environment there can be multiple sub-units, e.g., one or more cores, one or more graphics processing units (GPUs), one or more cache memories, etc. The sub-units can communicate with one another via a communication layer (CL).

If the CL frequency is higher than needed, a high power usage may result. If the CL frequency is too low, a latency in cache access and/or access to the main memory may grow, which can result in loss of performance, e.g., stalling of program execution.

DETAILED DESCRIPTION

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof)

are vital to a 'green technology' future, such as for power conservation and energy efficiency in products that encompass a large portion of the US economy.

Figure 1:
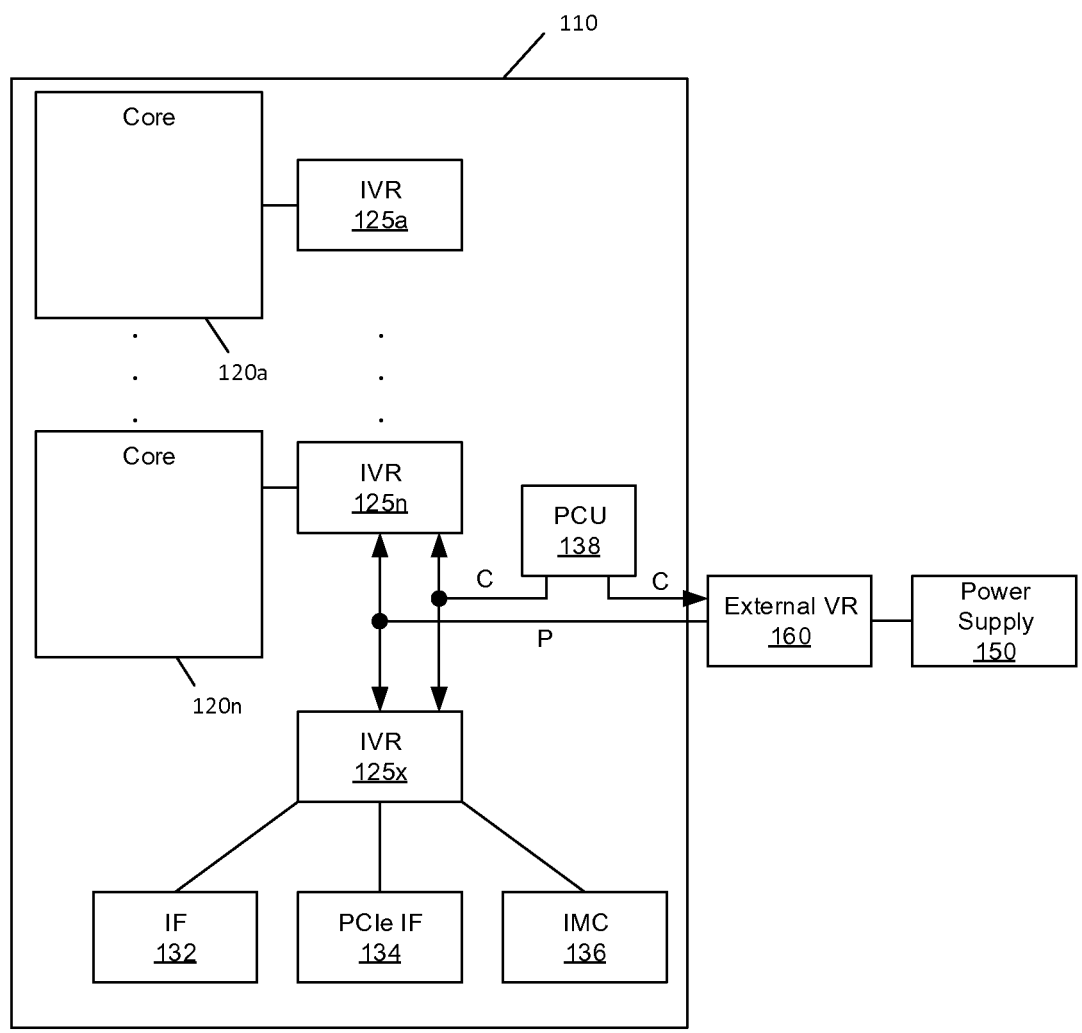
FIG. 1 is a block diagram of a portion of a system in accordance with an embodiment of the present invention.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007).

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or management power management source or system software).

While not shown for ease of illustration, understand that additional components may be present within processor 110 such as uncore logic and other components such as internal memories, e.g., one or more levels of a cache memory hierarchy and so forth. Furthermore, while shown in the implementation of FIG. 1 with an integrated voltage regulator, embodiments are not so limited.

Note that the power management techniques described herein may be independent of and complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle. Although described with these particular examples, understand that many other power management techniques may be used in particular embodiments.

Figure 2:
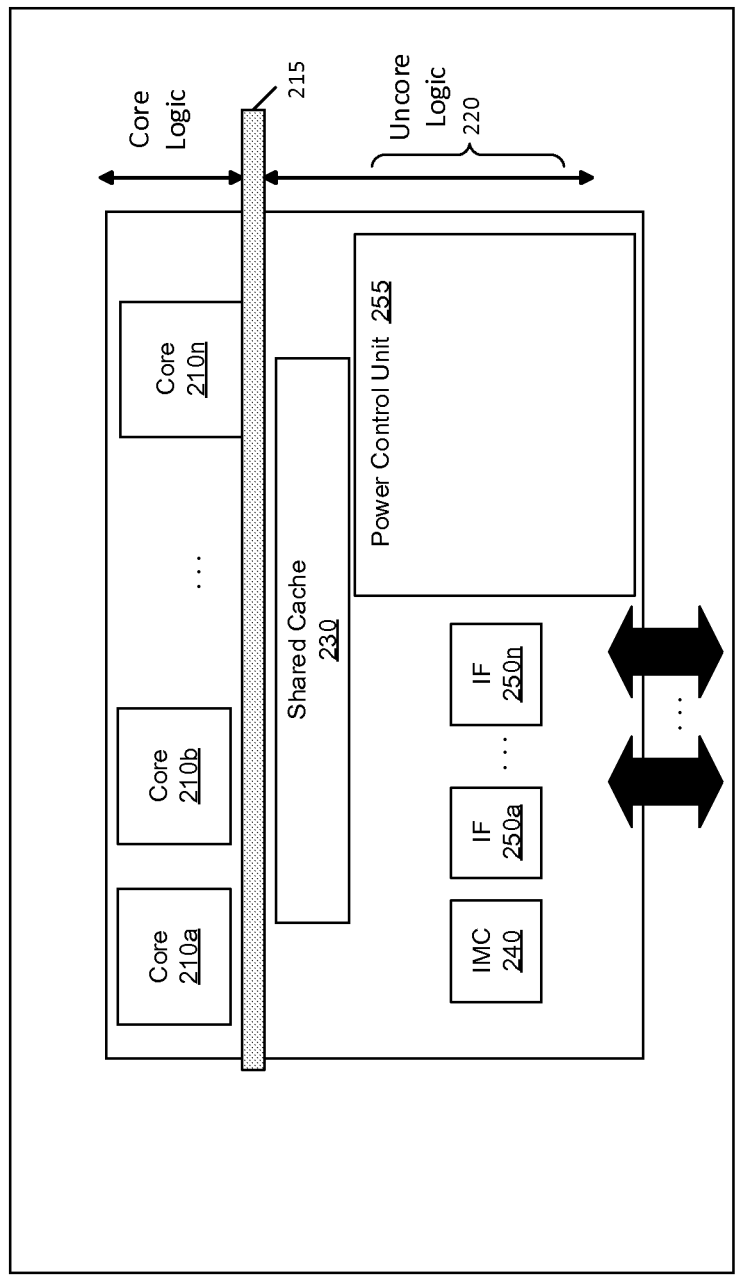
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores $210_a$-$210_n$. In one embodiment, each such core may be of an independent power domain and can be configured to enter and exit active states and/or maximum performance states based on workload. The various cores may be coupled via an interconnect 215 to a system agent or uncore 220 that includes various components. As seen, the uncore 220 may include a shared cache 230 which may be a last level cache. In addition, the uncore may include an integrated memory controller 240 to communicate with a system memory (not shown in FIG. 2), e.g., via a memory bus. Uncore 220 also includes various interfaces 250 and a power control unit 255, which may include logic to perform the power management techniques described herein.

In addition, by interfaces $250a$-$250n$, connection can be made to various off-chip components such as peripheral devices, mass storage and so forth. While shown with this particular implementation in the embodiment of FIG. 2, the scope of the present invention is not limited in this regard.

Figure 3:
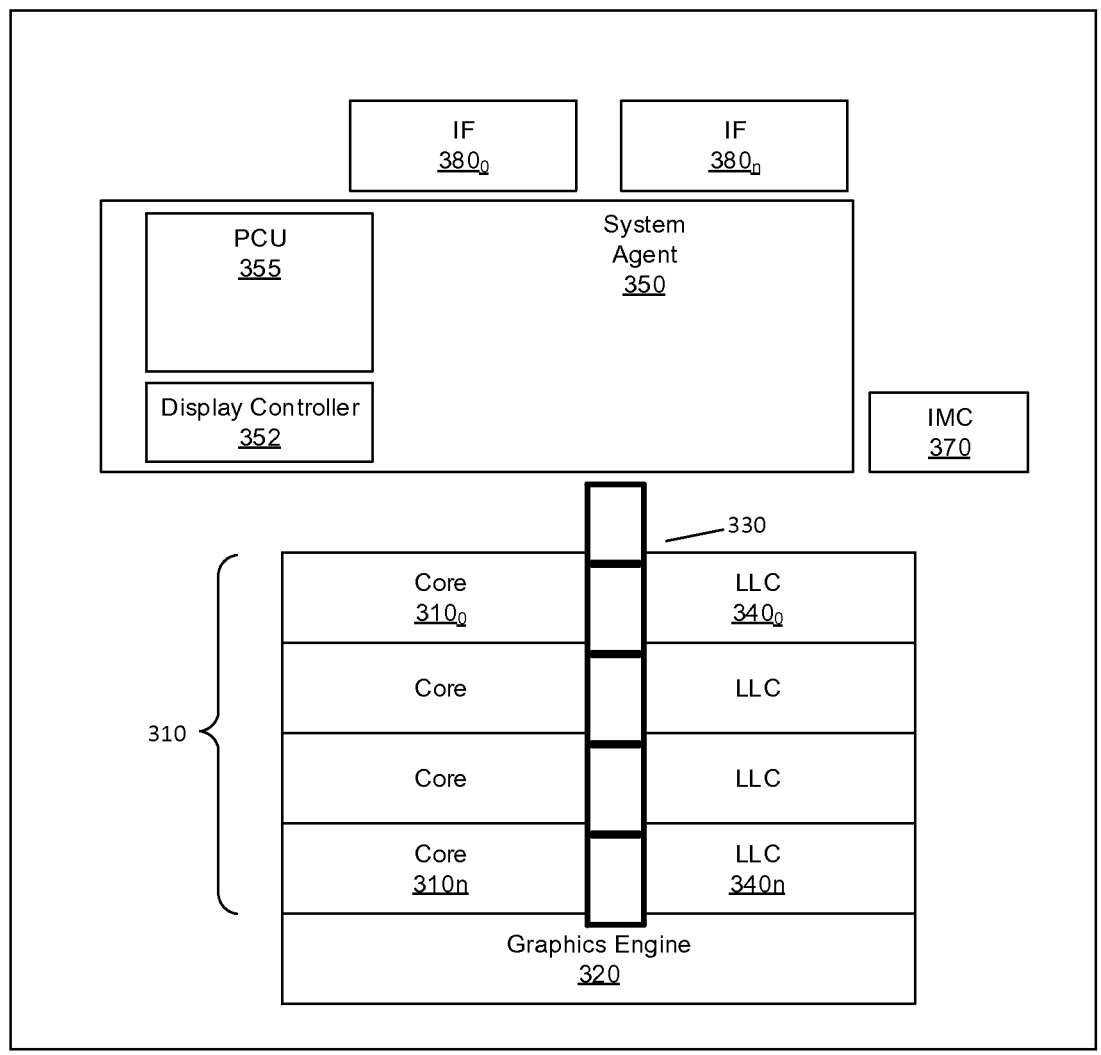
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores $310_0$-$310_n$, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) $340_0$-$340_n$. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain.

As further seen, system agent domain 350 may include display controller 352 which may provide control of and an interface to an associated display. As further seen, system agent domain 350 may include a power control unit 355 which can include logic to perform the power management techniques described herein.

As further seen in FIG. 3, processor 300 can further include an integrated memory controller (IMC) 370 that can provide for an interface to a system memory, such as a dynamic random access memory (DRAM). Multiple interfaces $380_0$-$380_n$ may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 3, understand the scope of the present invention is not limited in this regard.

Figure 4:
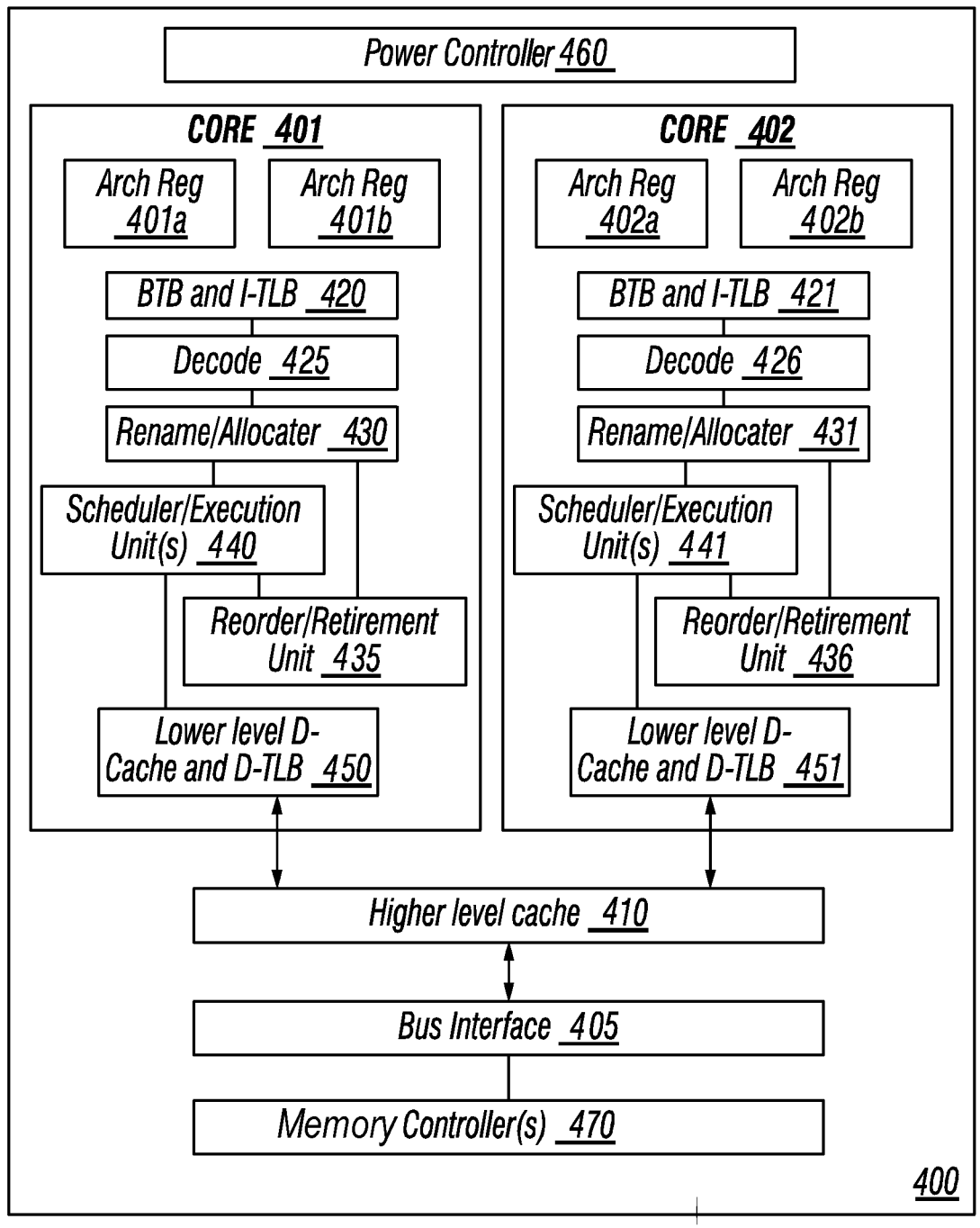
FIG. 4 is a block diagram of a processor including multiple cores in accordance with another embodiment of the present invention.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401a and 401b, which may also be referred to as hardware thread slots 401*a* and 401*b*. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401*a*, a second thread is associated with architecture state registers 401*b*, a third thread may be associated with architecture state registers 402*a*, and a fourth thread may be associated with architecture state registers 402*b*. Here, each of the architecture state registers (401*a*, 401*b*, 402*a*, and 402*b*) may be referred to as processing elements, thread slots, or thread units, as described above. As illustrated, architecture state registers 401*a* are replicated in architecture state registers 401*b*, so individual architecture states/contexts are capable of being stored for logical processor 401*a* and logical processor 401*b*. In core 401, other smaller resources, such as instruction pointers and renaming logic in allocator and renamer block 430 may also be replicated for threads 401*a* and 401*b*. Some resources, such as re-order buffers in reorder/retirement unit 435, ILTB 420, load/store buffers, and queues may be shared through partitioning. Other resources, such as general purpose internal registers, page-table base register(s), low-level data-cache and data-TLB 415, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 420 to decode fetched elements. Fetch logic, in one embodiment, includes individual sequencers associated with thread slots 401*a*, 401*b*, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401*a* and 401*b* are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
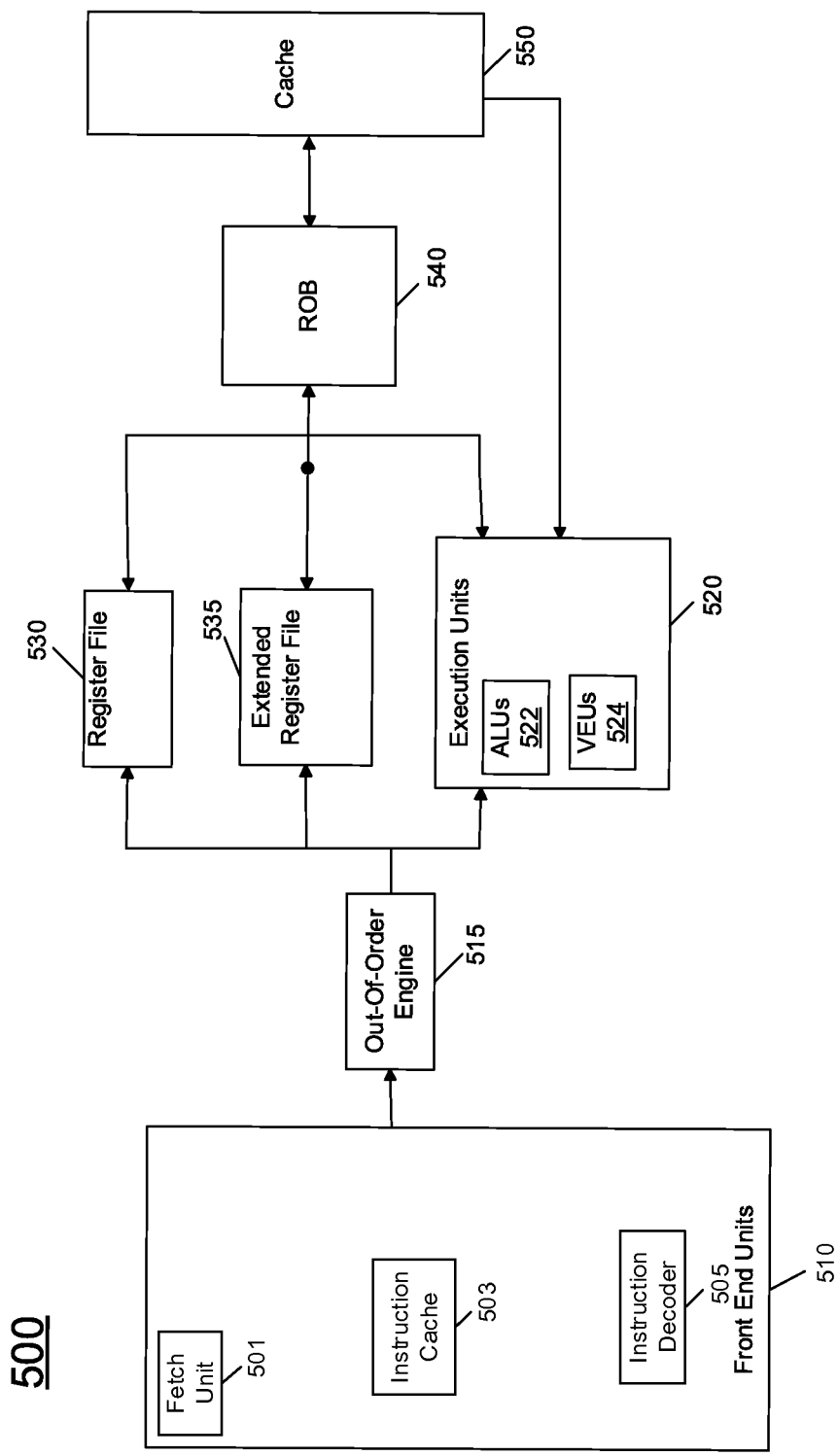
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. Extended register file 535 may provide storage for vector-sized units, e.g., 256 or 512 bits per register.

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
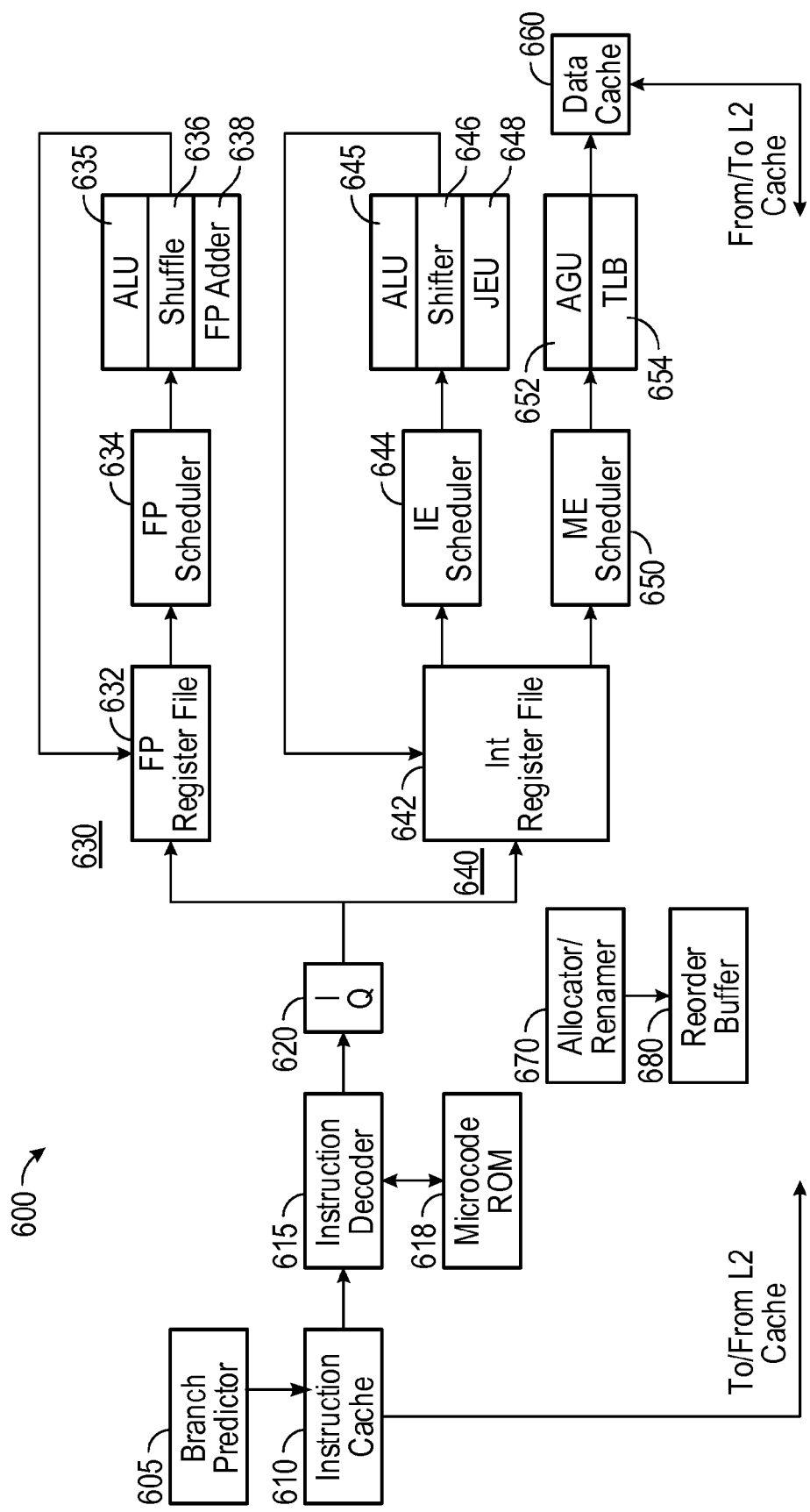
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel® Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue 620 for storage and delivery to a given execution pipeline. A microcode ROM 618 is coupled to instruction decoder 615.

A floating point pipeline 630 includes a floating point register file 632 which may include a plurality of architectural registers of a given bit with such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer register file 642 which may include a plurality of architectural registers of a given bit with such as 128 or 256 bits. Pipeline 640 includes an integer scheduler 644 to schedule instructions for execution on one of multiple execution units of the pipeline. In the embodiment shown, such execution units include an ALU 645, a shifter unit 646, and a jump execution unit 648. In turn, results generated in these execution units may be provided back to buffers and/or registers of register file 642. Of course understand while shown with these few example execution units, additional or different integer execution units may be present in another embodiment.

A memory execution scheduler 650 may schedule memory operations for execution in an address generation unit 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
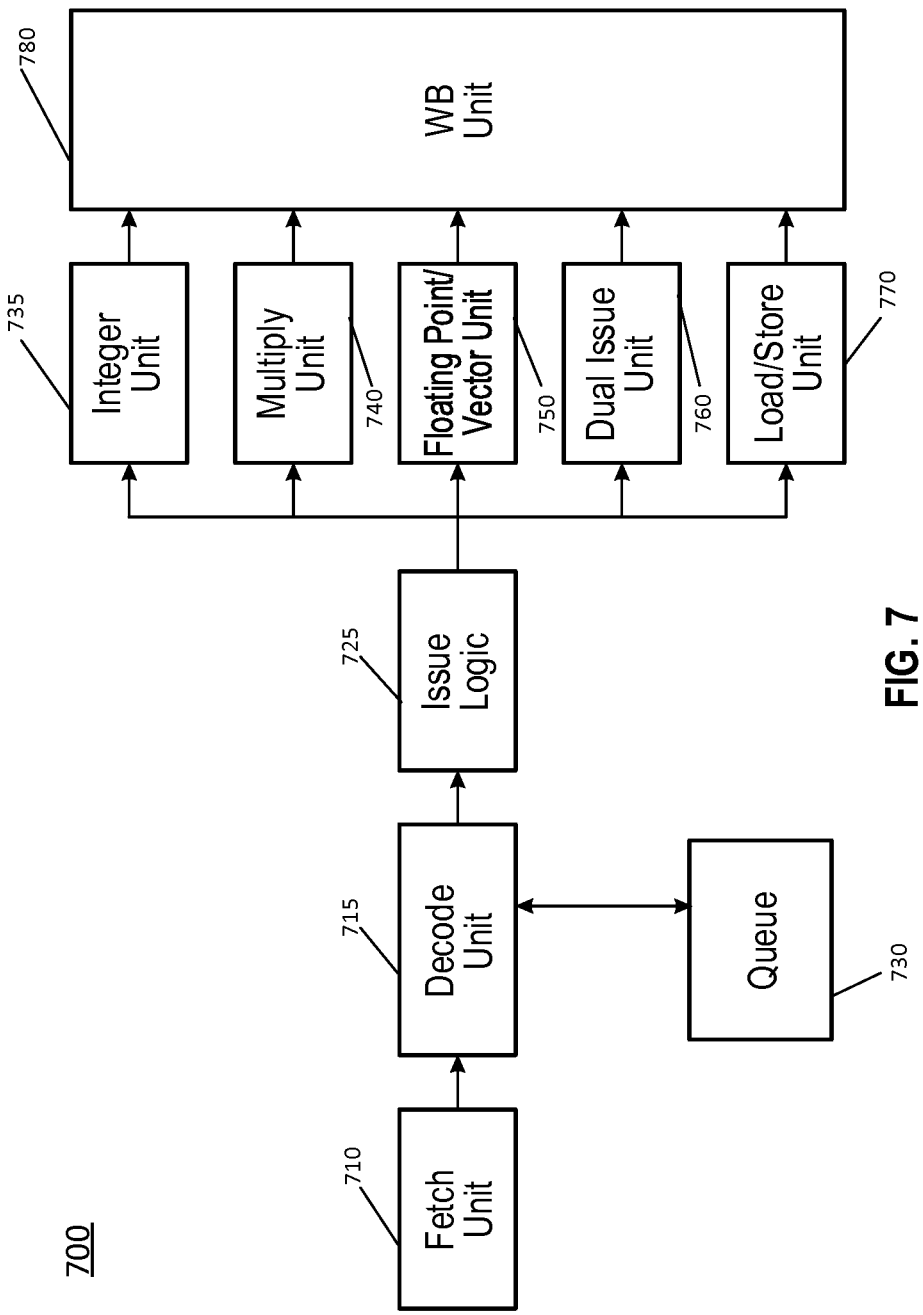
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instructions and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
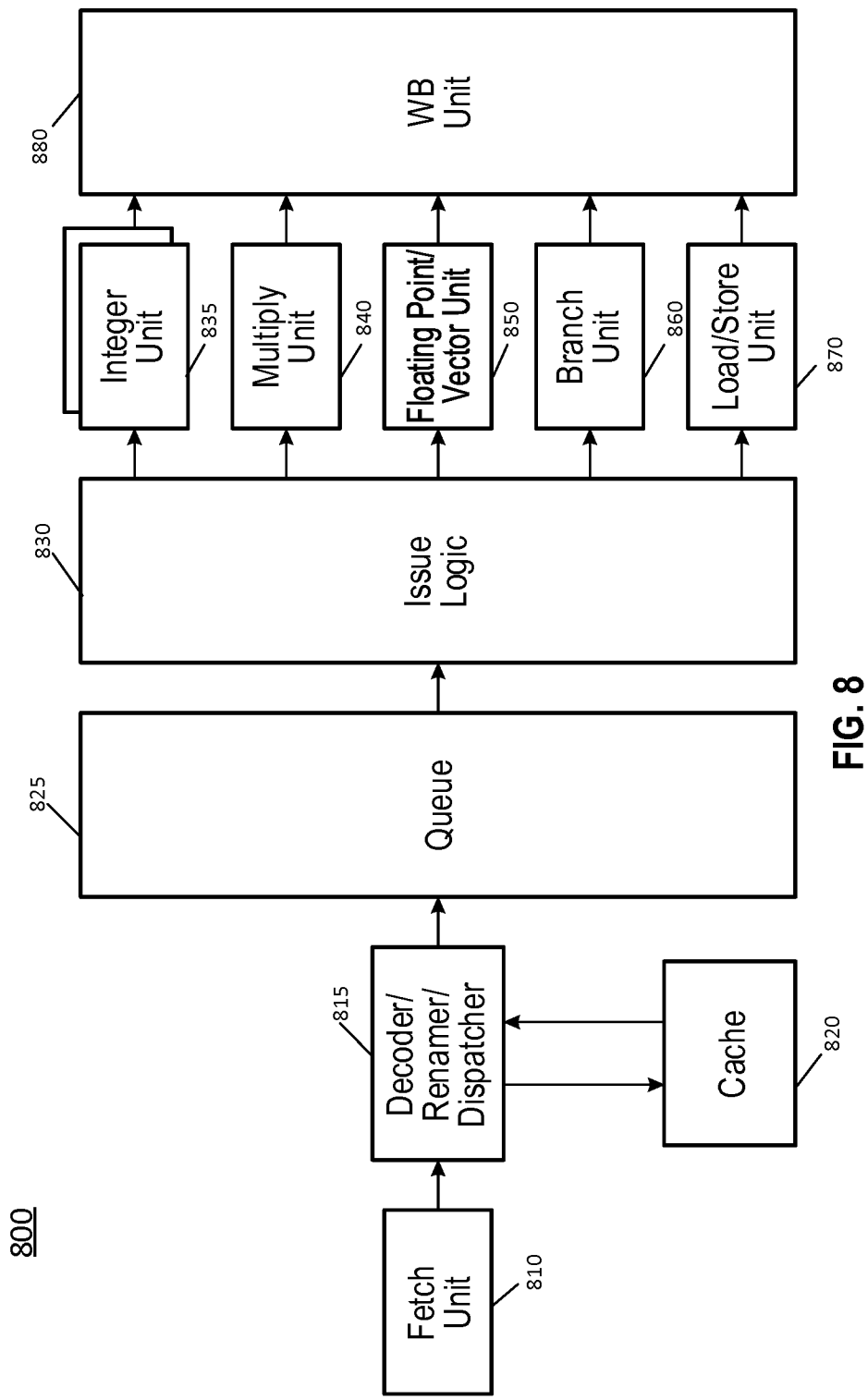
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions and provide them to a decoder/renamer/dispatcher 815, which may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
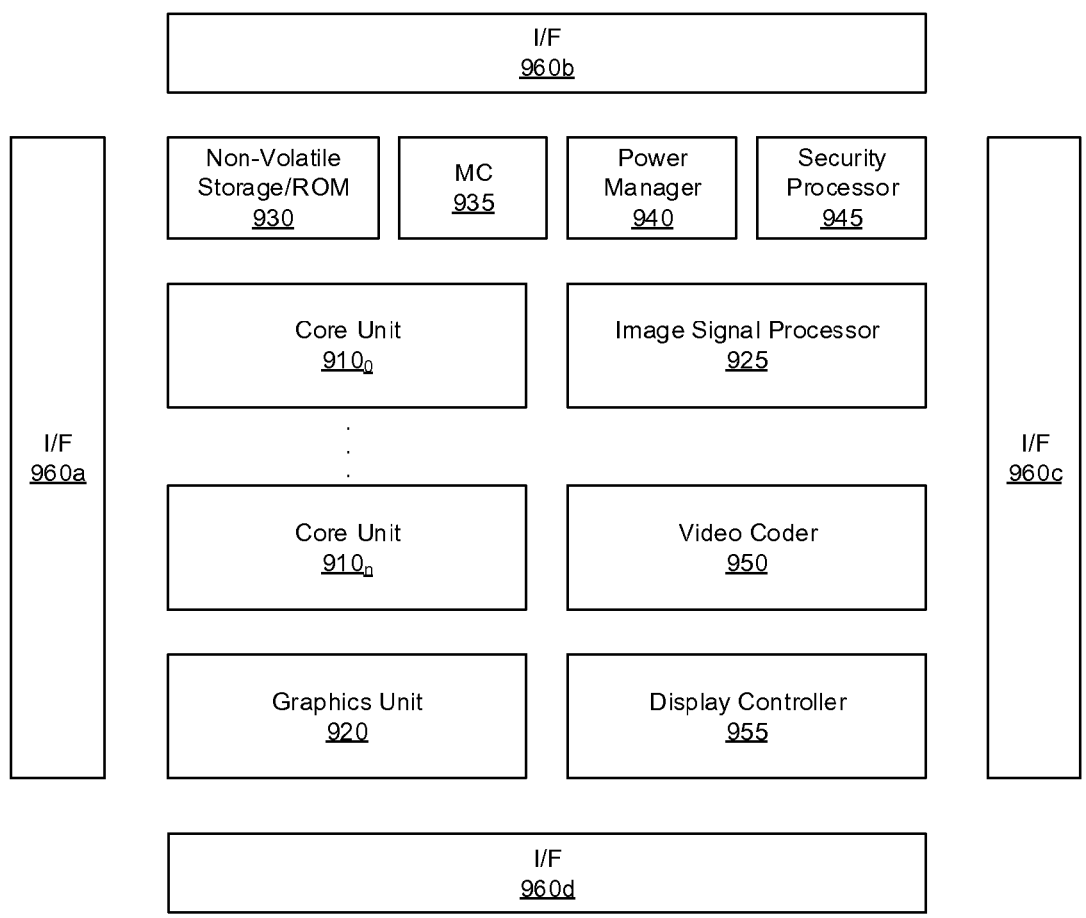
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device.

In the high level view shown in FIG. 9, processor 900 includes a plurality of core units $910_0$-$910_n$. Each core unit may include one or more processor cores, one or more cache memories and other circuitry. Each core unit 910 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management techniques described herein.

In some embodiments, SoC 900 may further include a non-coherent fabric coupled to the coherent fabric to which various peripheral devices may couple. One or more interfaces 960a-960d enable communication with one or more off-chip devices. Such communications may be according to a variety of communication protocols such as PCIe™ GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 10:
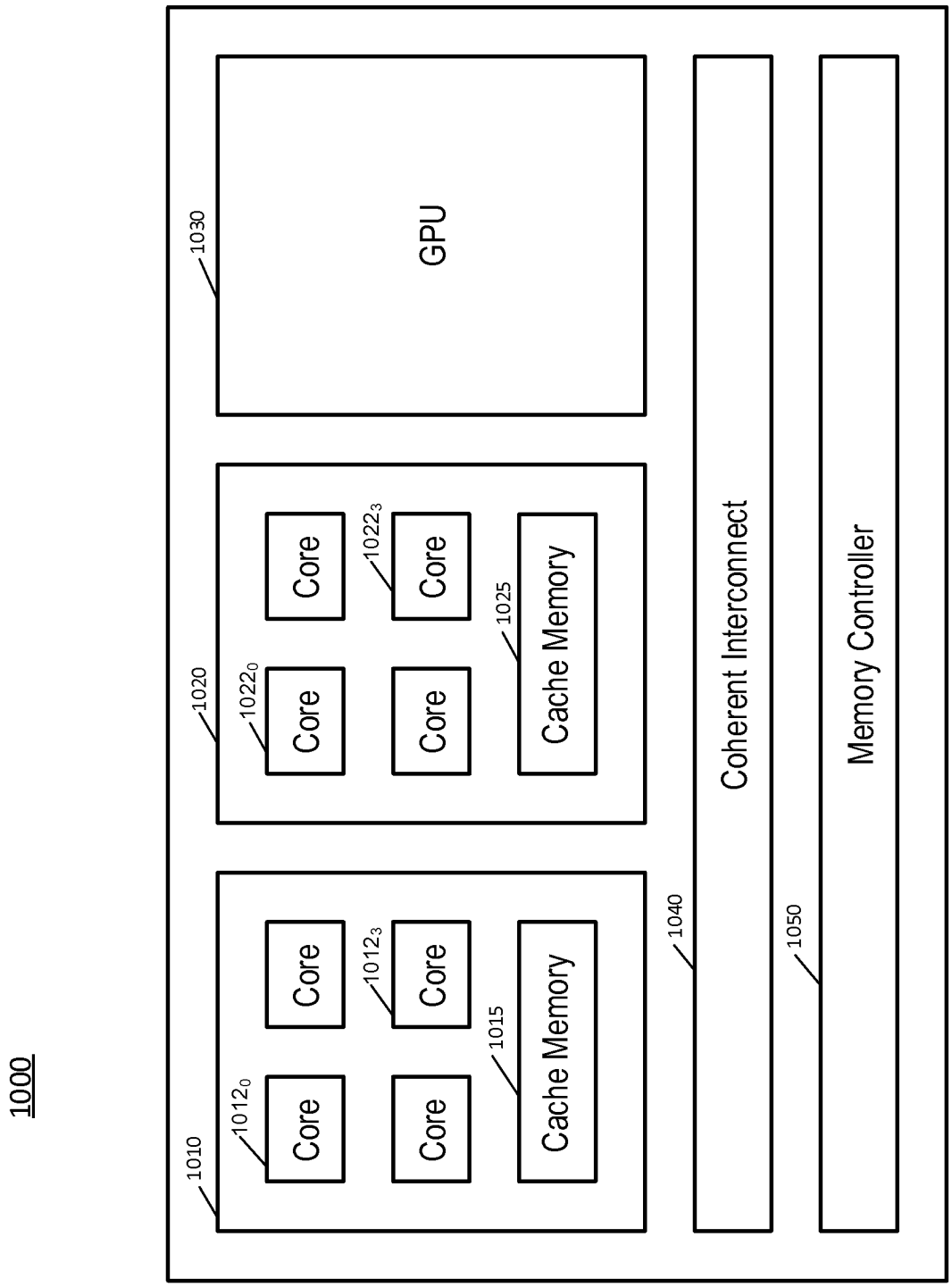
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 10, SoC 1000 includes a first core domain 1010 having a plurality of first cores $1012_0$-$1012_3$. In an example, these cores may be low power cores such as in-order cores. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores $1022_0$-$1022_3$. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
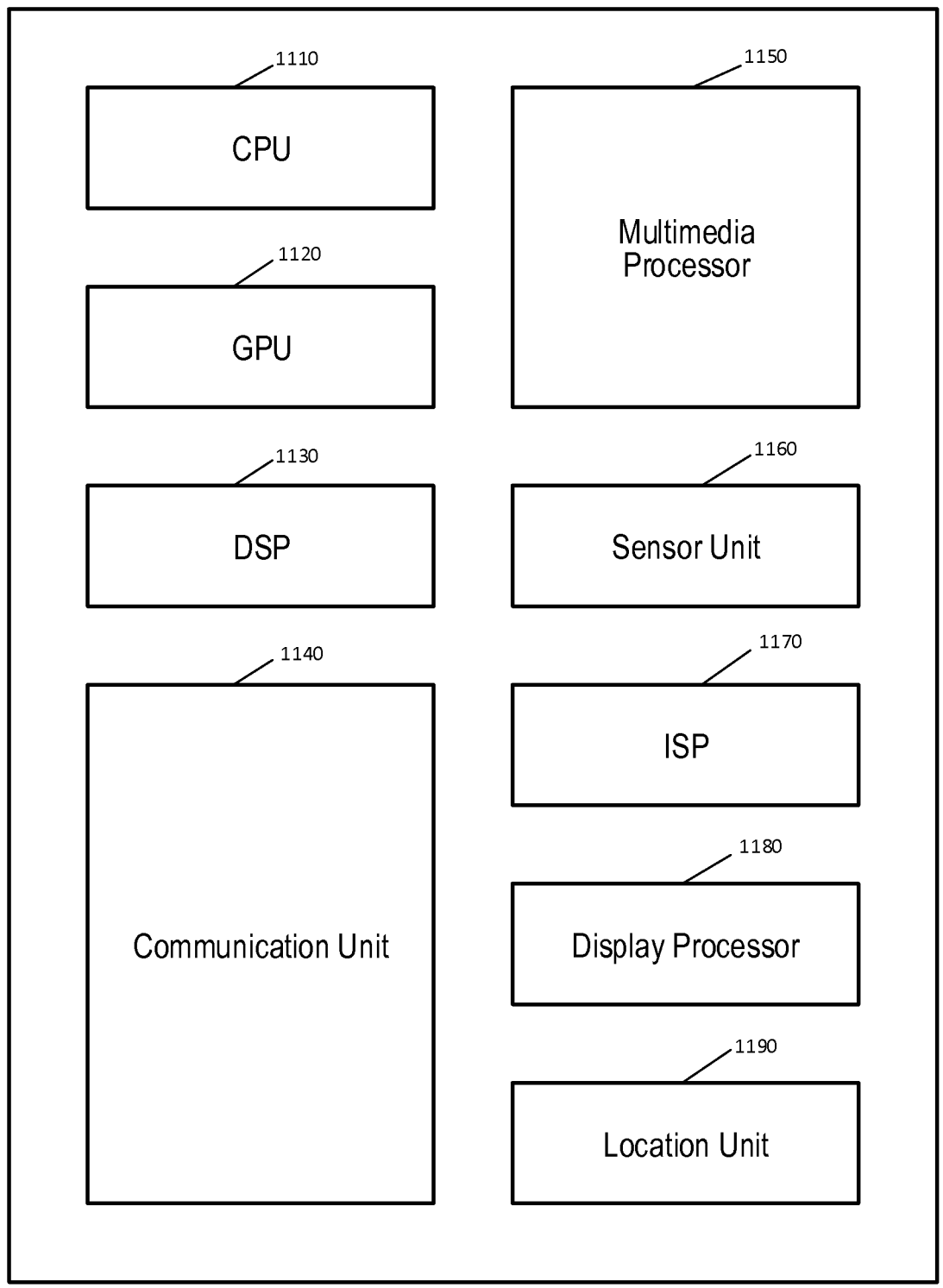
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area techniques such as Bluetooth™, IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
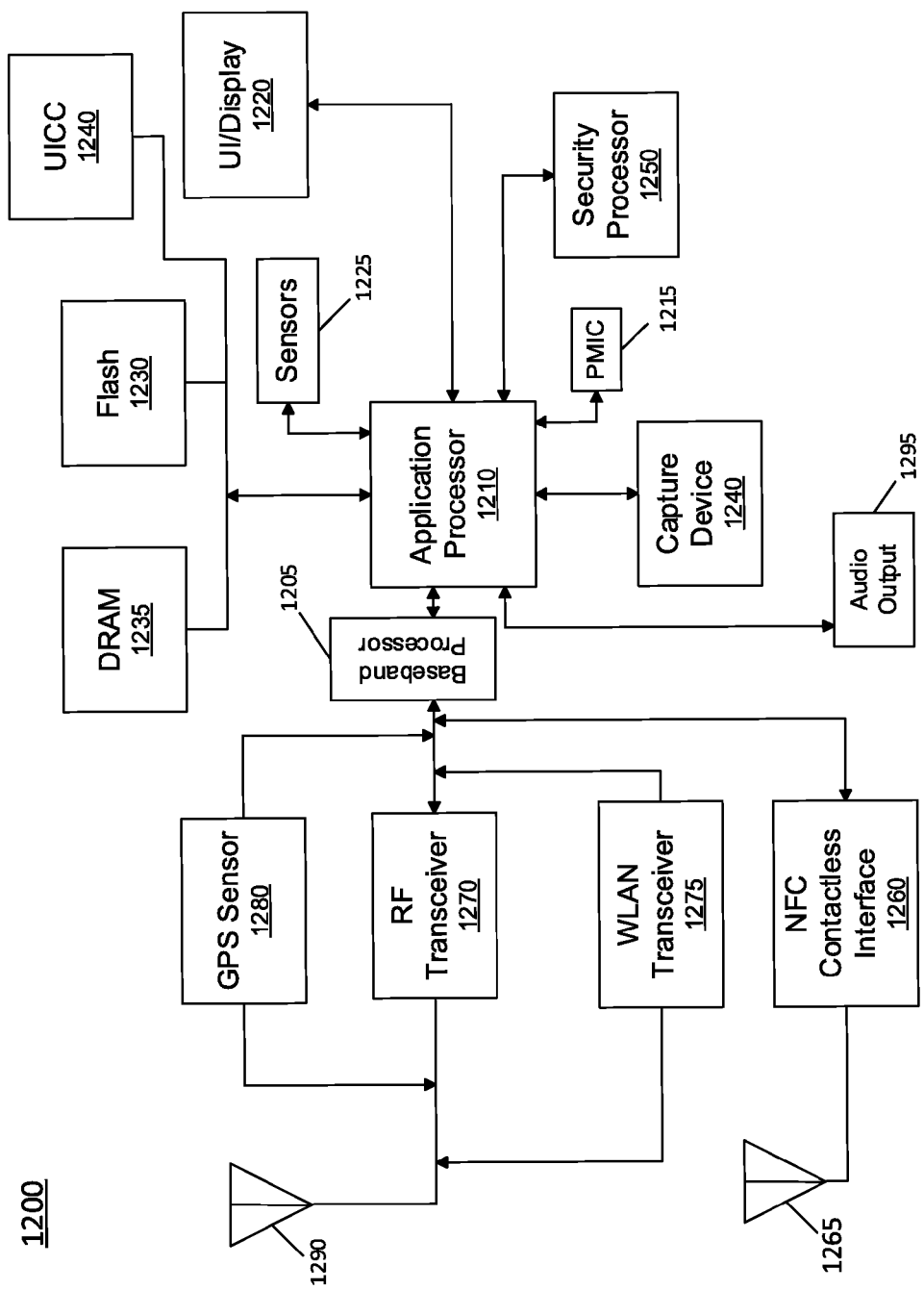
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications, such as according to a Bluetooth™ standard or an IEEE 802.11 standard such as IEEE 802.11a/b/g/n can also be realized.

Figure 13:
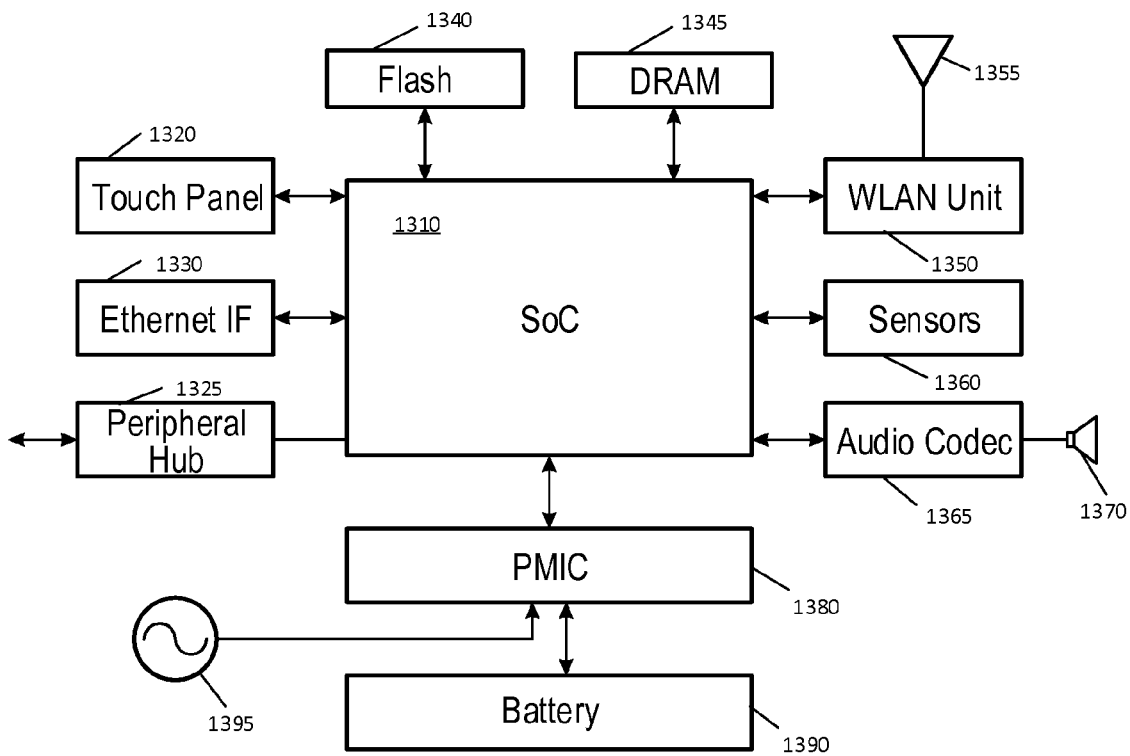
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols, including an IEEE 802.11 protocol, a Bluetooth™ protocol or any other wireless protocol.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
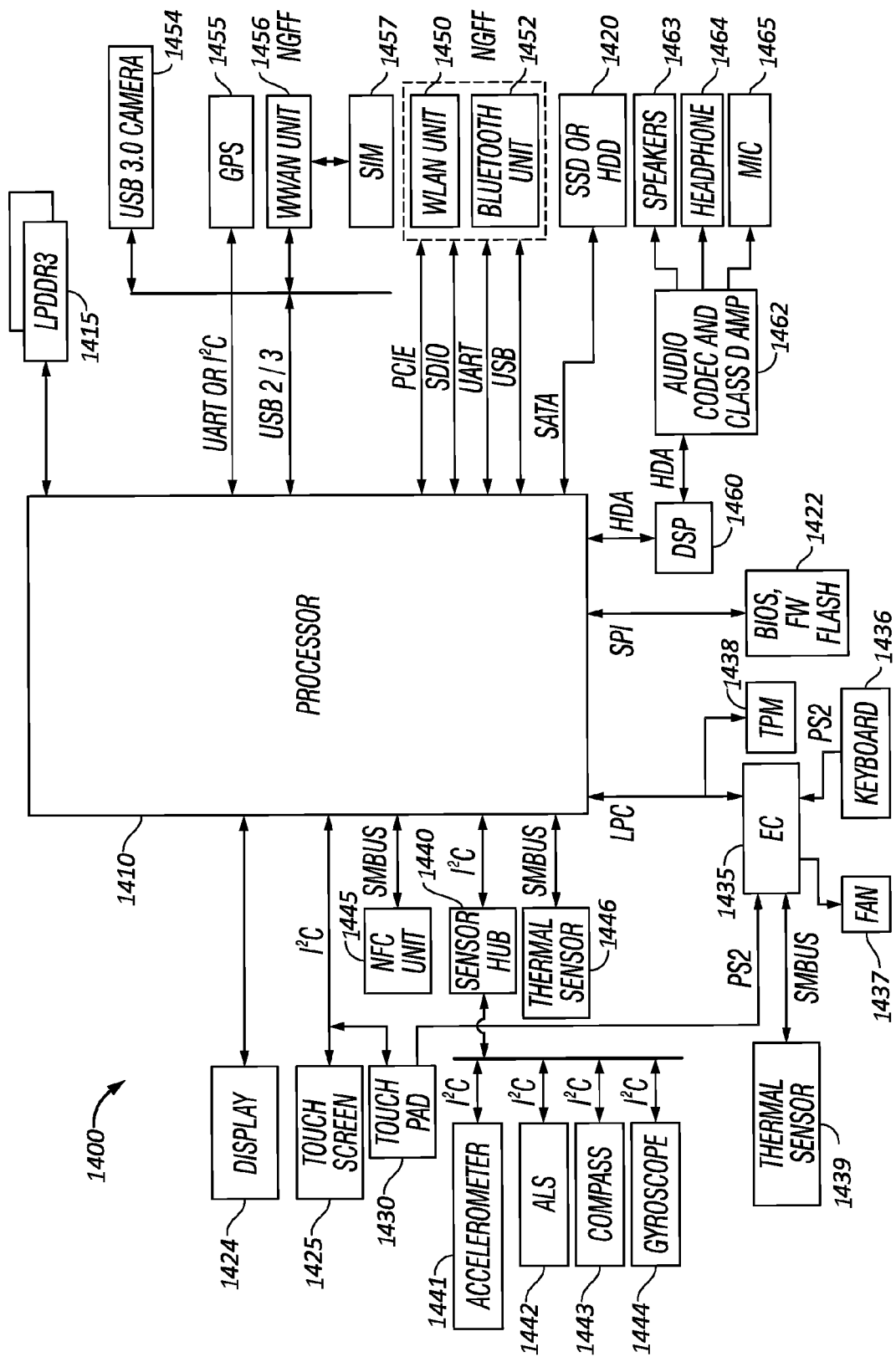
FIG. 14 is a block diagram of a representative computer system in which embodiments can be used.

Referring now to FIG. 14, a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an $I^2C$ interconnect. As further shown in FIG. 14, in addition to touch screen 1425, user input by way of touch can also occur via a touch pad 1430 which may be configured within the chassis and may also be coupled to the same $I^2C$ interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an $I^2C$ interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 in accordance with the Trusted Computing Group (TCG) TPM Specification Version 1.2, dated Oct. 2, 2003, may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth unit 1452. Using WLAN unit 1450, Wi-Fi™ communications in accordance with a given IEEE 802.11 standard can be realized, while via Bluetooth unit 1452, short range communications via a Bluetooth protocol can occur. These units may communicate with processor 1410 via, e.g., a USB link or a universal asynchronous receiver transmitter (UART) link. Or these units may couple to processor 1410 via an interconnect according to a PCIe™ protocol or another such protocol such as a serial data input/output (SDIO) standard.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given USB protocol such as a USB 2.0 or 3.0 link, or a UART or $I^2C$ protocol.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
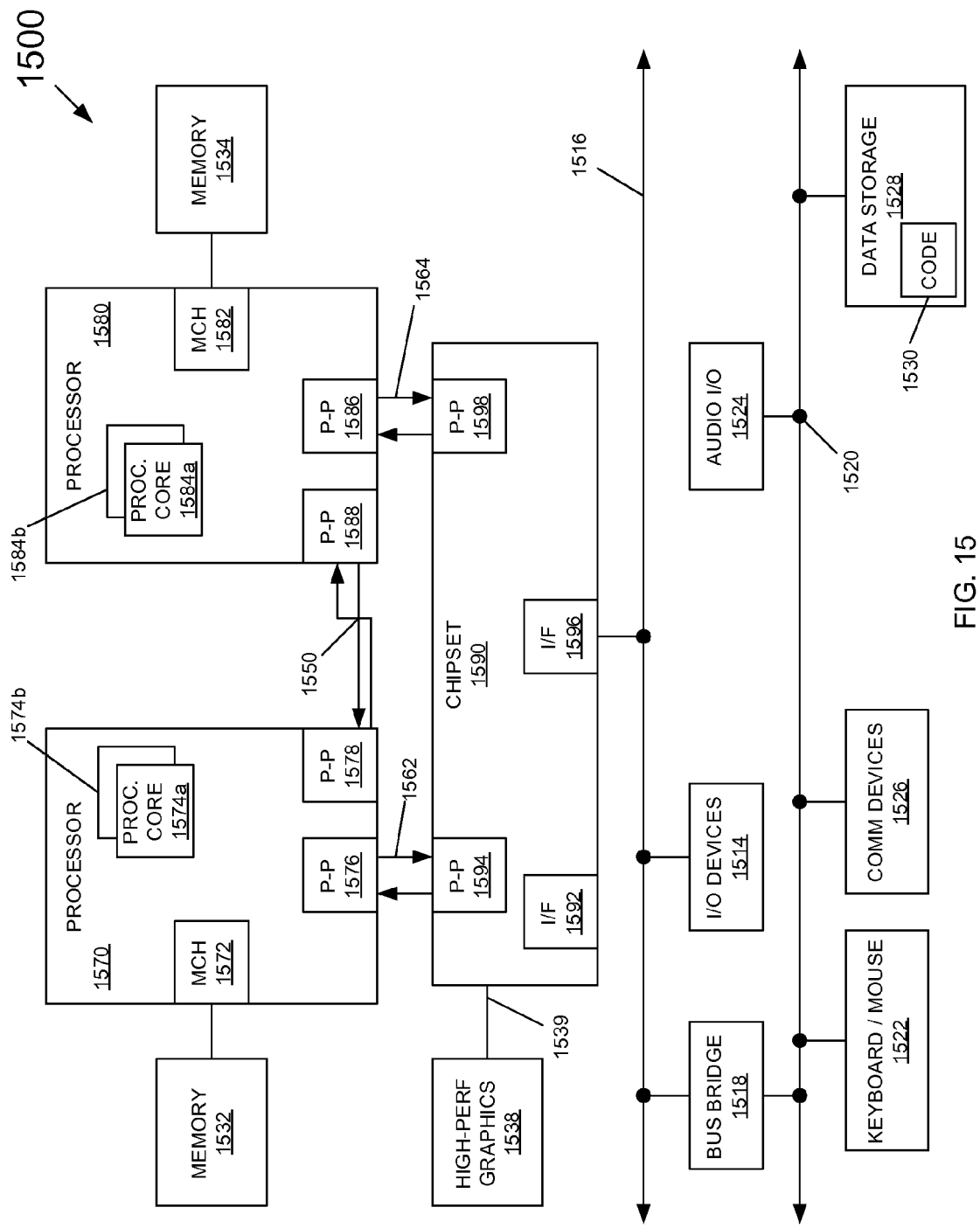
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processor cores 1574a and 1574b and processor cores 1584a and 1584b), although potentially many more cores may be present in the processors. Each of the processors can include a PCU or other power management logic to perform processor-based power management as described herein.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

In various embodiments, a CL can run at a selected CL frequency, e.g., a frequency of the cache memory, or at another frequency. In various embodiments, to increase efficiency of a computational system, the CL frequency ($f_{CL}$) (also interconnect frequency herein) may be adjusted. Adjustment of the $f_{CL}$ may reduce latency associated with access to cache memory, may reduce instruction execution stalls, and/or may reduce latency associated with access to external memory, e.g., dynamic random access memory (DRAM), while the system runs without excessive expenditure of power by the communication layer CL.

In various embodiments, data such as architectural data relevant to bandwidth, stalls, and latency of various computational elements (e.g., cache access, memory access) may be collected over time, and the data may be analyzed to select a value of $f_{CL}$ that reduces latency in cache accesses, provides adequate bandwidth (e.g., memory access bandwidth), and/or reduces execution stall rate, in an energy-efficient manner. In various embodiments, the data may be analyzed through use of Bayesian prediction technique to determine whether a workload is scalable, e.g., whether adjustment of the $f_{CL}$ will result in greater computational efficiency (e.g., faster computation of the workload and/or computation of workload with the reduced power expenditure).

A Bayesian predictor may be employed:

$$P(C \mid \vec{M}) = \frac{P(\vec{M} \mid C) * P(C)}{P(\vec{M})}$$

where P( ) is a probability, $P(C \mid \vec{M})$ is a conditional probability of C given $\vec{M}$, C is a scalability characteristic (e.g., scalable, non-scalable), and M is a set of measurements ($\vec{M}$) associated with the computational system ("system" herein). Denominator $P(\vec{M})$ is constant, and therefore is suppressed in the calculations below.

$$P(C \mid \vec{M}) \alpha P(\vec{M} \mid C) * P(C)$$

$$\vec{M} = M_1, M_2, M_3, \ldots M_n$$

It is assumed that the measurements ($\vec{M}$) form a Gaussian distribution based on C (scalability characteristic):

$$P(M_i, C) = \frac{1}{\sqrt{2\pi\sigma_{i,c}^2}} * e^{-\frac{(M_i - \mu_{i,c})^2}{2\sigma_{i,c}^2}}$$

where $\sigma_{i,C}$ (standard deviation of a plurality of measurements of variable $M_i$) and $\mu_{i,C}$ (mean value of the plurality of measurements of variable $M_i$) are dependent on C and i, and where i is an index of the measurement.

We can choose, a priori, the probability P(C) to be a function of the communication layer frequency $f_{CL}$. In general, the higher the $f_{CL}$, the lower the chances of benefit from increasing the $f_{CL}$, e.g., the workload is less scalable. In other embodiments, the probability P(C) may be chosen to be a function of a single frequency of a compute domain, or of a plurality of independent computational frequencies, or of a combination of variables.

In one embodiment, the probability P(C) is chosen a priori to be a linear function with a ratio of interconnect frequency to frequency of the compute domain serving as a multiplier, e.g., multiplier=$f_{CL}/f_{compute}$:

$$P(C=\text{scalable}) = m_1 + n_1 * \text{multiplier}$$

$$P(C=\text{non-scalable}) = m_2 + n_2 * \text{multiplier}$$

while $$P(C=\text{scalable}) + P(C=\text{non-scalable}) = 1$$

Because the measurements ($\vec{M}$) are not independent, $$P(C \mid M_1 \ldots M_n) = \frac{1}{\sqrt{(2\pi)^n \mid \Sigma \mid}} * e^{-\frac{(M-\mu)^T \Sigma^{-1}(M-\mu)}{2\sigma_{i,c}^2}},$$

which is a distribution formula for a vector of Gaussian variables. It is assumed for simplicity that there are only three measurement variables $M_1$, $M_2$, and $M_3$. In other embodiments, the calculation can be expanded, e.g., with more measurements.

For three variables:

$$(M-\mu)^T \sum^{-1}(M-\mu) =$$

$$(\alpha, \beta, \gamma) * \begin{pmatrix} a & b & c \\ b & d & e \\ c & e & f \end{pmatrix} \begin{pmatrix} \alpha \\ \beta \\ \gamma \end{pmatrix} = a\alpha^2 + d\beta^2 + f\gamma^2 + 2*(b\alpha\beta + c\alpha\gamma + e\beta\gamma)$$

where $\alpha = M_1 - \mu_1$, $\beta = M_2 - \mu_2$, $\gamma = M_3 - \mu_3$, and (a, b, c, d, e, f) are constants that describe variance and co-variance. Hence, $$P(C = \text{Scalable} \mid M) =$$

$$(m_1 * n_1 * \text{multiplier}) * X * e^{-\frac{(a\alpha^2 + d\beta^2 + f\gamma^2 + 2*(b\alpha\beta + c\alpha\gamma + e\beta\gamma))}{2}}$$

$$P(C = \text{non-Scalable} \mid M) =$$

$$(m_2 * n_2 * \text{multiplier}) * Y * e^{-\frac{(a\alpha^2 + d\beta^2 + f\gamma^2 + 2*(b\alpha\beta + c\alpha\gamma + e\beta\gamma))}{2}}$$

where X and Y are constants.
We want to calculate:

$$\frac{P(C = \text{Scalable} \mid M)}{P(C = \text{non-Scalable} \mid M)} = (>1, 1, <1)$$

If the above ratio is greater than 1, scalability is indicated, and if less than 1, non-scalability is indicated.

Because natural logarithm ln (x) varies directly with x, we can instead calculate a Predictor function as follows:

$$\text{Predictor} = \ln\left(\frac{P(c = \text{Scalable} \mid M)}{P(c = \text{non-Scalable} \mid M)}\right) =$$

$$A\alpha^2 + D\beta^2 + F\gamma^2 + 2*(B\alpha\beta + C\alpha\gamma + E\beta\gamma) + \ln\left(\frac{m_1 + n_1*\text{multiplier}}{m_2 + n_2*\text{multiplier}}\right)$$

where A, B, C, D, E, F are constants.
We use approximation $\ln(1+x) \cong x$, and the fact that P(C) sums to 1:

$$\ln\left(\frac{m_1 + n_1*\text{multiplier}}{m_2 + n_2*\text{multiplier}}\right) \cong$$

$$m_1 + n_1*\text{multiplier} - 1 - (m_2 + n_2*\text{multiplier} - 1) =$$

$$m_1 + n_1*\text{multiplier} - 1 - (1 - m_1 - n_1*\text{multiplier}) =$$

$$2*m_1 + n_1*\text{multiplier} = J*\text{multiplier} + K,$$

where J and K are constants. Therefore, $$\text{Predictor} = \ln\frac{P(c = \text{Scalable} \mid M)}{P(c = \text{non-Scalable} \mid M)} =$$

$$A\alpha^2 + D\beta^2 + F\gamma^2 + 2*(B\alpha\beta + C\alpha\gamma + E\beta\gamma) + J*\text{multiplier} + K$$

where α, β and γ are the measurements $M_i$ minus the corresponding mean value $\mu_i$.

In some embodiments, the measurements can be normalized, e.g., over time.

If the Predictor is larger than 0 (e.g., P(C=scaleable|M)/PC=non-scalable|M)>1, scalability is indicated, and increase of the $f_{CL}$ is suggested. If the predictor is less than zero, reduction of $f_{CL}$ is suggested. Also, the larger the Predictor, the more certain is a decision to increase the $f_{CL}$. If the Predictor is close to 0, we may choose let the value $f_{CL}$ remain unchanged.

In some embodiments, a threshold may be invoked to decide whether to change $f_{CL}$. For example, in some embodiments, the Predictor value may be compared with an increase threshold ($\text{Thresh}_{incr}$) to determine whether to increase $f_{CL}$. In other embodiments, the Predictor value may be compared with a decrease threshold ($\text{Thresh}_{decr}$) to determine whether to decrease $f_{CL}$. The threshold $\text{Thresh}_{incr}$ or $\text{Thresh}_{decr}$ may be reflective of user preference, e.g., how much additional power (due to increase of $f_{CL}$) the user is willing to expend in order to gain additional performance (e.g., computational speed).

Computation of the Predictor may be time consuming. Therefore, in some embodiments if software suddenly requests a high computational frequency, it may be preferable to increase $f_{CL}$ by a multiplier instead of to increase $f_{CL}$ by small increments until a large $f_{CL}$ is achieved. In one embodiment, instead of incrementally increasing/decreasing the $f_{CL}$, the increase/decrease may be made as a multiplier (or divider) of the $f_{CL}$, e.g., increase the $f_{CL}$ through multiplication of $f_{CL}$ by an integer such as 2, 3, 4, etc., or decrease the $f_{CL}$ through division of the $f_{CL}$ by an integer such as 2, 3, 4, etc. Alternatively, an updated $f_{CL}'$ may be a multiplication or division of a domain frequency (e.g., graphics processing unit frequency $f_{GPU}$) by a multiplier G, e.g., $f_{CL}' = (f_{GPU})*(G)$.

The constants A, B, C, D, E, F, J, and K may be determined through laboratory tests conducted prior to operation of the system. The laboratory tests may run workloads at high and low communication layer interconnect frequencies $f_{CL}$, determine the scalability of the workloads (e.g., through comparison of workload execution rates) and record hardware counter measurements. The workloads may be divided into scalable or non-scalable by comparison of timing of the workloads at the different interconnect frequencies $f_{CL}$, from which a distribution of $P(\vec{M}|C)$ may be determined for both C=scalable and C=non-scalable. After conducting the laboratory tests, the calculations above may be used to determine the values of the constants A, B, C, D, E, F, J, and K.

Figure 16:
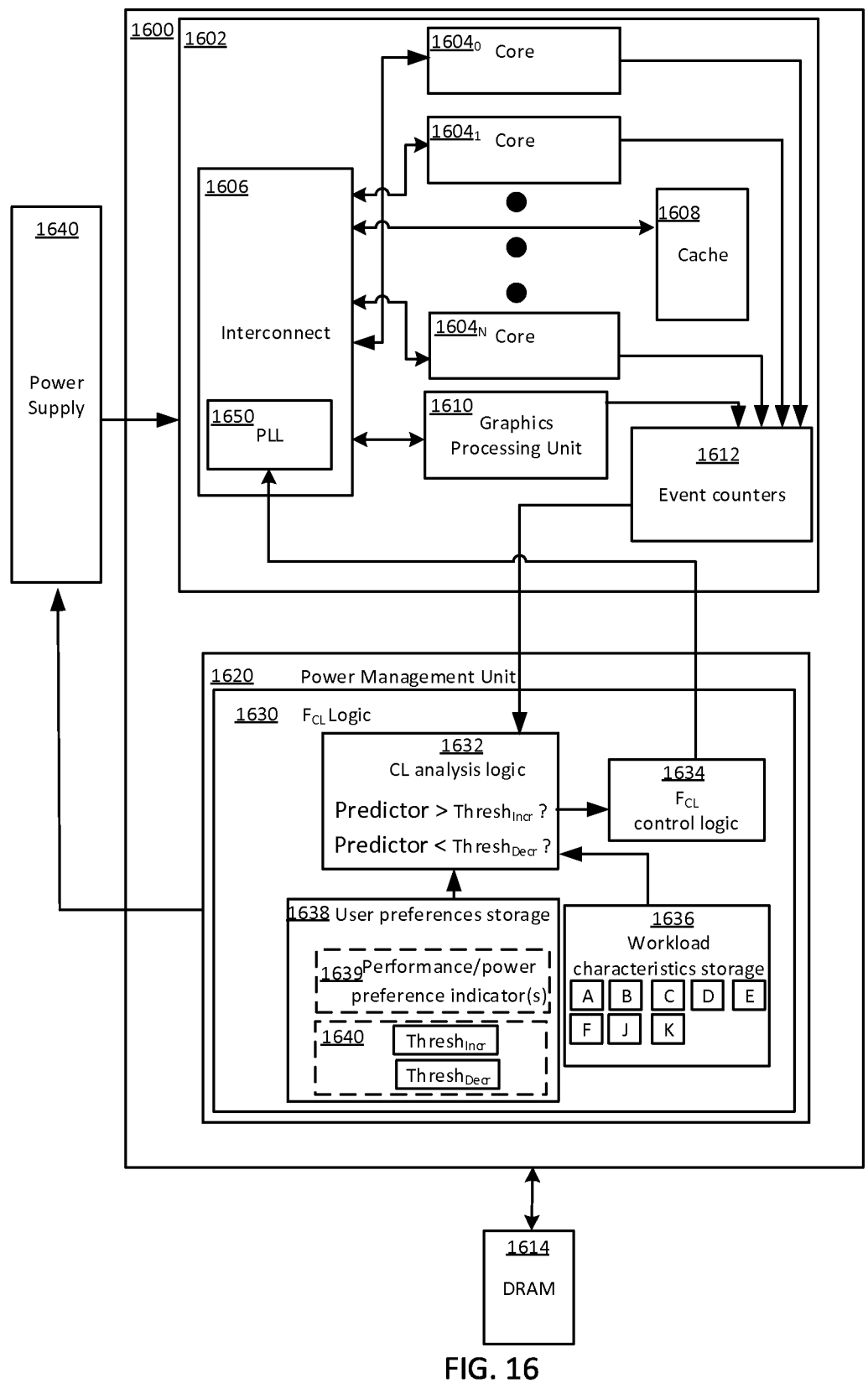
FIG. 16 is a block diagram of a system, according to embodiments of the present invention.

FIG. 16 is a block diagram of a system 1600, according to embodiments of the present invention. The system 1600 includes a computational device (e.g., multicore processor, system on a chip, or other computational device) 1602 that includes one or more cores, $1604_0$-$1604_N$, a graphics processing unit (GPU) 1610, cache memory 1608, event counters 1612, and interconnect 1606 that may include an interconnect phase locked loop (PLL) 1650. The system 1600 also includes a power management unit (PMU) 1620 that includes a communication layer frequency ($f_{CL}$) logic 1630 that may include software, firmware, a microcontroller or other hardware, or a combination thereof. The $f_{CL}$ logic 1630 includes CL analysis logic 1632, $f_{CL}$ control logic 1634, user preferences storage 1638, and workload characteristics storage 1636. The system 1600 is coupled to a dynamic random access memory (DRAM) 1614 and to a power supply 1640.

In operation, the interconnect 1606 operates at $f_{CL}$ and couples to the GPU 1610, the cores $1604_0$-$1604_N$, and the cache 1608. The $f_{CL}$ logic 1630 monitors events such as changes in bandwidth, cache accesses, instruction stalls, memory accesses, etc. A record of one or more types of events may be stored in the event counters 1612.

In some embodiments, the CL analysis logic 1632 monitors the event counters 1612 on a continual basis. In other embodiments, the CL analysis logic 1632 monitors the event counters 1612 periodically, e.g., in time intervals of 1 millisecond, or at another periodic time interval. The CL analysis logic 1632 may calculate, using e.g., Bayesian analysis as described above, a Predictor value that can indicate whether a workload to be processed on system 1600 is scalable with $f_{CL}$, e.g., whether a change in $f_{CL}$ will increase efficiency the system 1600 (e.g., to more efficiently handle the workload with regard to computation time and/or energy usage). The Predictor may be calculated based on the stored values in the event counters 1612 (e.g. associated with bandwidth events, stalls of instruction execution, latency associated with cache accesses, latency associated with memory accesses, and optionally other events).

Previously established workload characteristics may be used to calculate the Predictor value. Workload characteristics (e.g., constants such as A, B, C, D, E, F, J, and K, and thresholds) may be determined in laboratory tests, and may be stored in the workload characteristics storage 1636. User preferences such as performance/power preference indicator(s) 1639 (e.g., a preference for high computational performance at the expense of increased power usage, or a preference for decreased power usage at the expense of computational performance, or other user preferences) may be stored in user preferences storage 1638 and may be used to set threshold values to determine whether to change $f_{CL}$.

Alternatively or additionally, threshold values 1640 (e.g., Predictor thresholds) may be stored in the user preferences storage 1638.

The CL analysis logic 1632 may send an indication to the $f_{CL}$ control logic 1634 to adjust the $f_{CL}$, e.g., if the Predictor value determined by the CL analysis logic 1632 satisfies a Predictor threshold, e.g., exceeds the increase threshold (Thresh$_{incr}$) or is less than the decrease threshold (Thresh$_{decr}$). The $f_{CL}$ control logic 1634 may cause a change in the $f_{CL}$ (e.g., change in the frequency of the PLL 1650) responsive to the indication received from the CL analysis logic 1632.

In some embodiments, adjustment of the $f_{CL}$ may be made in one or more small increments. In other embodiments, the adjustment of the $f_{CL}$ may be by application of a multiplier or divider, e.g., a multiplication factor of 2, 3, or larger integer, or a division factor of 2, or 3, or larger integer. User preferences stored in user preferences storage 1636 may determine whether change in $f_{CL}$ is to be a small increment or an integer multiplier of $f_{CL}$. Adjustment of the $f_{CL}$ can result in increase in memory bandwidth or cache bandwidth, reduction in cache access latency, reduction in memory access latency, reduction in execution stalls, other adjustments, and/or a combination thereof.

Figure 17:
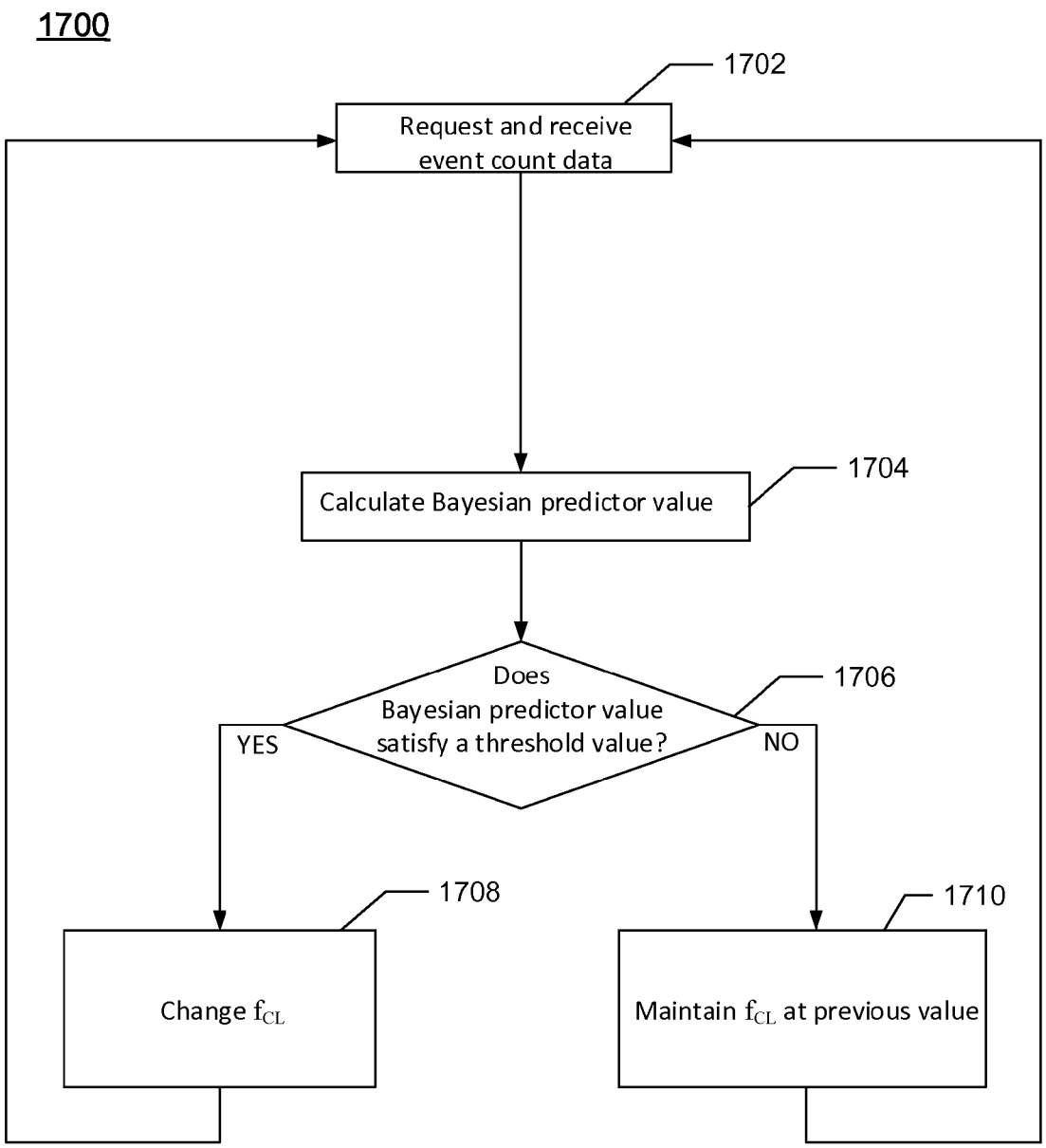
FIG. 17 is a flow diagram of a method according to embodiments of the present invention.

FIG. 17 is a flow diagram of a method 1700 of determining whether to change a communication layer frequency $f_{CL}$ within a processor, according to embodiments of the present invention. Beginning at block 1702, $f_{CL}$ logic of the processor requests and receives event count data such as DRAM accesses, cache accesses, stalls, etc. Continuing to block 1704, a Bayesian predictor value is calculated based on the event count data received. Moving to decision diamond 1706, the Bayesian predictor value is compared to one or more threshold values. If the Bayesian predictor value satisfies one of the threshold values (e.g., greater than a frequency increase threshold, or less than a frequency decrease threshold), proceeding to block 1708 $f_{CL}$ is changed. If the Bayesian predictor value does not satisfy a decrease threshold or an increase threshold, proceeding to block 1710 no indication to change the $f_{CL}$ is generated and the $f_{CL}$ is maintained at the previous value. Returning to block 1702, event count data for another window of time (e.g., a subsequent window of time) is requested and received. Thus, the event count data is repeatedly requested and the Bayesian predictor value is updated based on each set of event count data received. A decision as to whether to change the $f_{CL}$ may be based on the calculated Bayesian predictor value.

Figure 18:
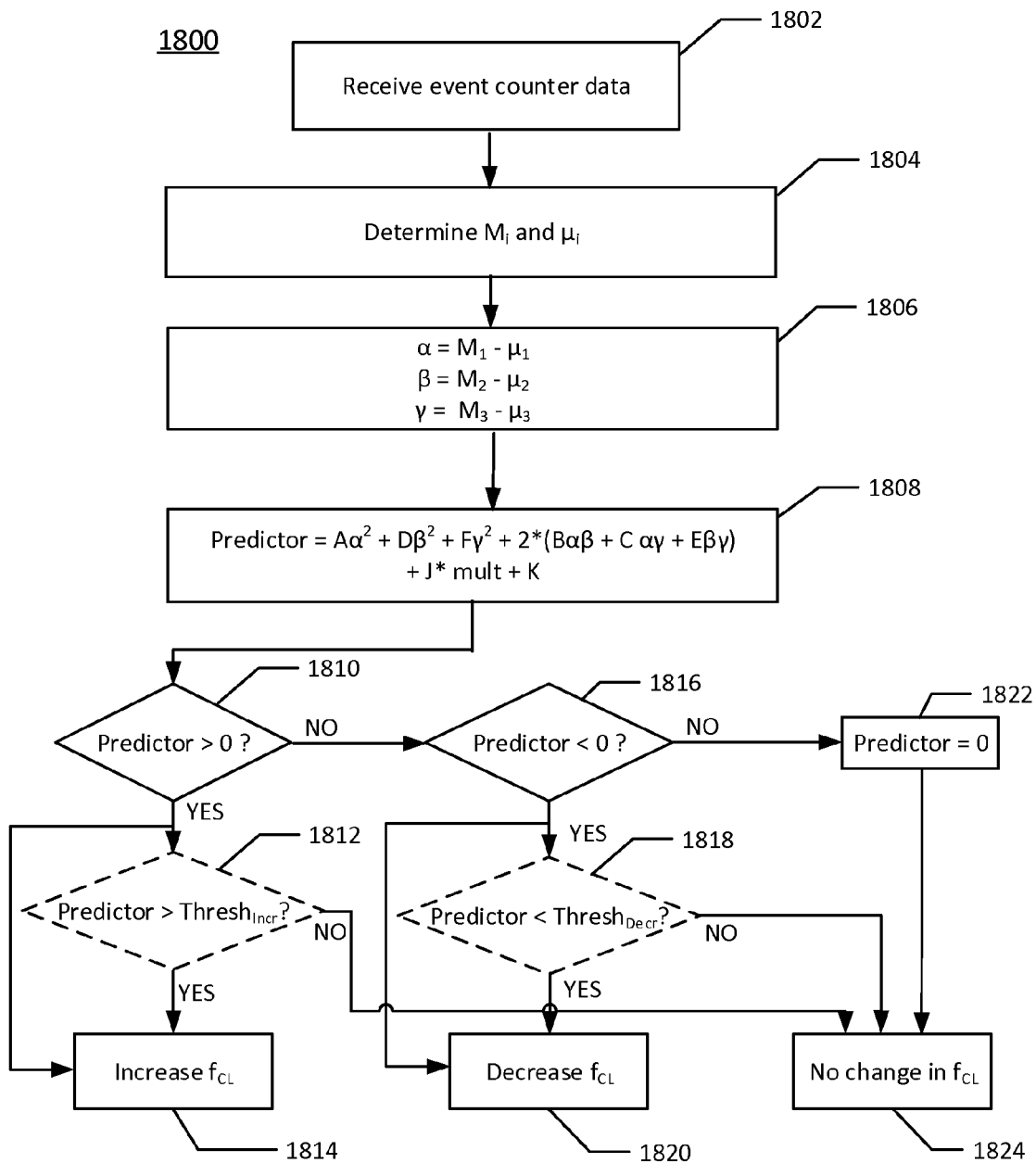
FIG. 18 is a flow diagram of a method according to some embodiments of the present invention.

FIG. 18 is a flow diagram of a method 1800 of determining whether to change a communication layer frequency $f_{CL}$, according to some embodiments of the present invention. At block 1802, communication layer frequency logic, e.g., within a power management unit of a processor, receives event counter data stored in event counters. The event counter data may reflect events that include instruction execution stalls, cache accesses, memory accesses, and other indicators of computational activity. Advancing to block 1804, values of each of several variables $M_i$ and their respective mean values $\mu_i$ are determined based on the data received from the event counters.

Moving to block 1806, values of parameters α, β, and γ are determined from the values of $M_i$ and $\mu_i$. Proceeding to block 1808, a Predictor value is determined based on a Bayesian probability calculation using the parameters α, β, and γ and constants A, B, C, D, E, F, J, K that have been determined via laboratory tests of various workloads.

Continuing to decision diamond 1810, if the Predictor value is greater than zero, in some embodiments advancing to decision diamond 1812 the Predictor value is compared to an increase threshold (Thresh$_{incr}$). If the Predictor value exceeds Thresh$_{incr}$, advancing to block 1814 an indication may be generated (e.g., by $f_{CL}$ analysis logic within $f_{CL}$ logic) to increase the $f_{CL}$, to be sent to $f_{CL}$ control logic within the $f_{CL}$ logic. The $f_{CL}$ control logic may control the $f_{CL}$ by adjustment of an interconnect PLL, e.g., within the processor. If, at decision diamond 1812, the Predictor value does not exceed Thresh$_{incr}$, moving to block 1824 an indication of no change in $f_{CL}$ may be generated and sent to the $f_{CL}$ control logic.

In other embodiments, at decision diamond 1810 if the Predictor value is greater than zero, proceeding directly to block 1814 an increase in the $f_{CL}$ may be indicated by the $f_{CL}$ logic (e.g., no comparison to a threshold value is conducted) and an indication to increase the $f_{CL}$ may be communicated to the $f_{CL}$ control logic, which may adjust the $f_{CL}$ responsive to receipt of the indication to increase the $f_{CL}$.

Back at decision diamond 1810, if the Predictor value is not greater than zero, moving to decision diamond 1816, if the Predictor value is less than zero, in some embodiments, proceeding to decision diamond 1818 the Predictor value may be compared to a decrease threshold Thresh$_{decr}$. If the Predictor value is less than Thresh$_{decr}$, advancing to block 1820 an indication to decrease the $f_{CL}$ may be generated by the $f_{CL}$ analysis logic. Back at decision diamond 1818, if the Predictor value is not less than the increase threshold, moving to block 1824 the $f_{CL}$ analysis logic indicates that no change is to be made to $f_{CL}$.

In other embodiments, at decision diamond 1816 if the Predictor value is less than zero, advancing directly to block 1820 an indication may be generated by the $f_{CL}$ analysis logic to decrease the $f_{CL}$.

If, at decision diamond 1816, the Predictor is equal to zero (block 1822), proceeding to block 1824 the $f_{CL}$ analysis logic indicates that no change is to be made to $f_{CL}$.

Figure 19:
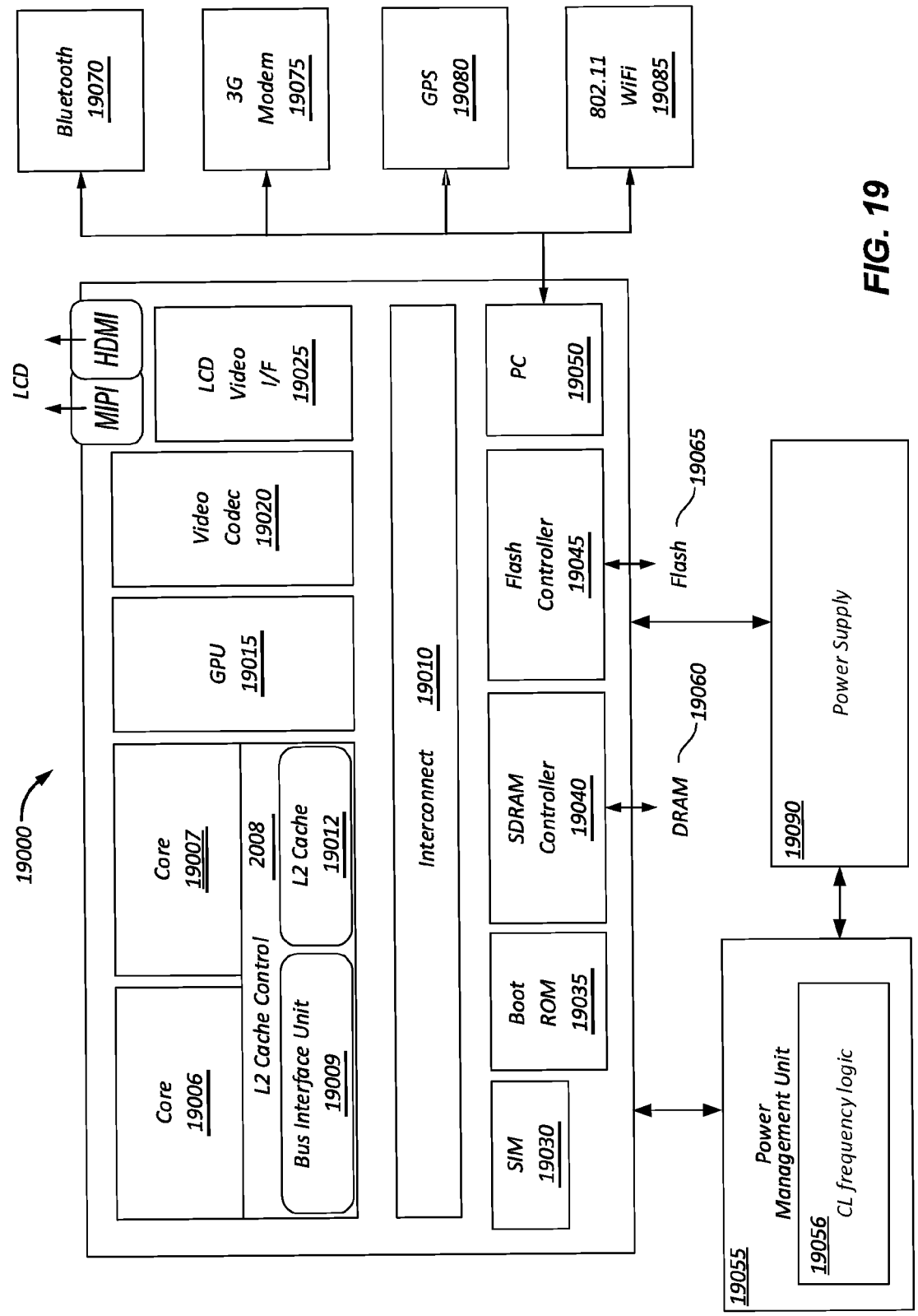
FIG. 19 is a block diagram of a system on a chip (SoC) design in accordance with an embodiment of the present invention.

FIG. 19 is a block diagram of a system on a chip (SoC) design in accordance with an embodiment of the present invention. As a specific illustrative example, SoC 19000 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SoC 19000 includes two cores—19006 and 19007. Cores 19006 and 19007 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 19006 and 19007 are coupled to cache control 19008 that is associated with bus interface unit 19009 and L2 cache 19012 to communicate with other parts of system 19000. Interconnect 19010 includes an on-chip interconnect, such as an IOSF or AMBA.

Interconnect 19010 provides communication channels to other components, such as a Subscriber Identity Module (SIM) 19030 to interface with a SIM card, a boot ROM 19035 to hold boot code for execution by cores 19006 and 19007 to initialize and boot SOC 19000, a SDRAM controller 19040 to interface with external memory (e.g. DRAM 19060), a flash controller 19045 to interface with non-volatile memory (e.g. Flash 19065), a peripheral controller 19050 (e.g. Serial Peripheral Interface) to interface with peripherals, video codecs 19020 and video interface 19025 to display and receive input (e.g. touch enabled input), graphics processing unit (GPU) 19015 to perform graphics related computations, etc. Power management unit (PMU) 19055 determines power to be provided by a power supply 19090 to each of the modules of the SOC 19000 including power to cores 19006, 19007, and GPU 19015.

The PMU 19055 includes a communications layer frequency ($f_{CL}$) logic 19056 that, responsive to one or more changes in workload activity of core 19006, 19007 or of GPU 19015, is to determine based on a Bayesian calculation whether to adjust the $f_{CL}$ of interconnect 19010, according to embodiments of the present invention. The Bayesian calculation can be based on event counter values that may reflect any of, e.g., bandwidth, memory accesses and latency, instruction stalls, cache accesses and latency, or other variables associated with computational activity, according to embodiments of the present invention.

In addition, the system illustrates peripherals for communication, such as a Bluetooth module 19070, 3G modem 19075, GPS 19080, and WiFi 19085. Note as stated above, a UE includes a radio for communication. As a result, these peripheral communication modules are not all required. However, in a UE some form of radio for external communication may be included.

Figure 20:
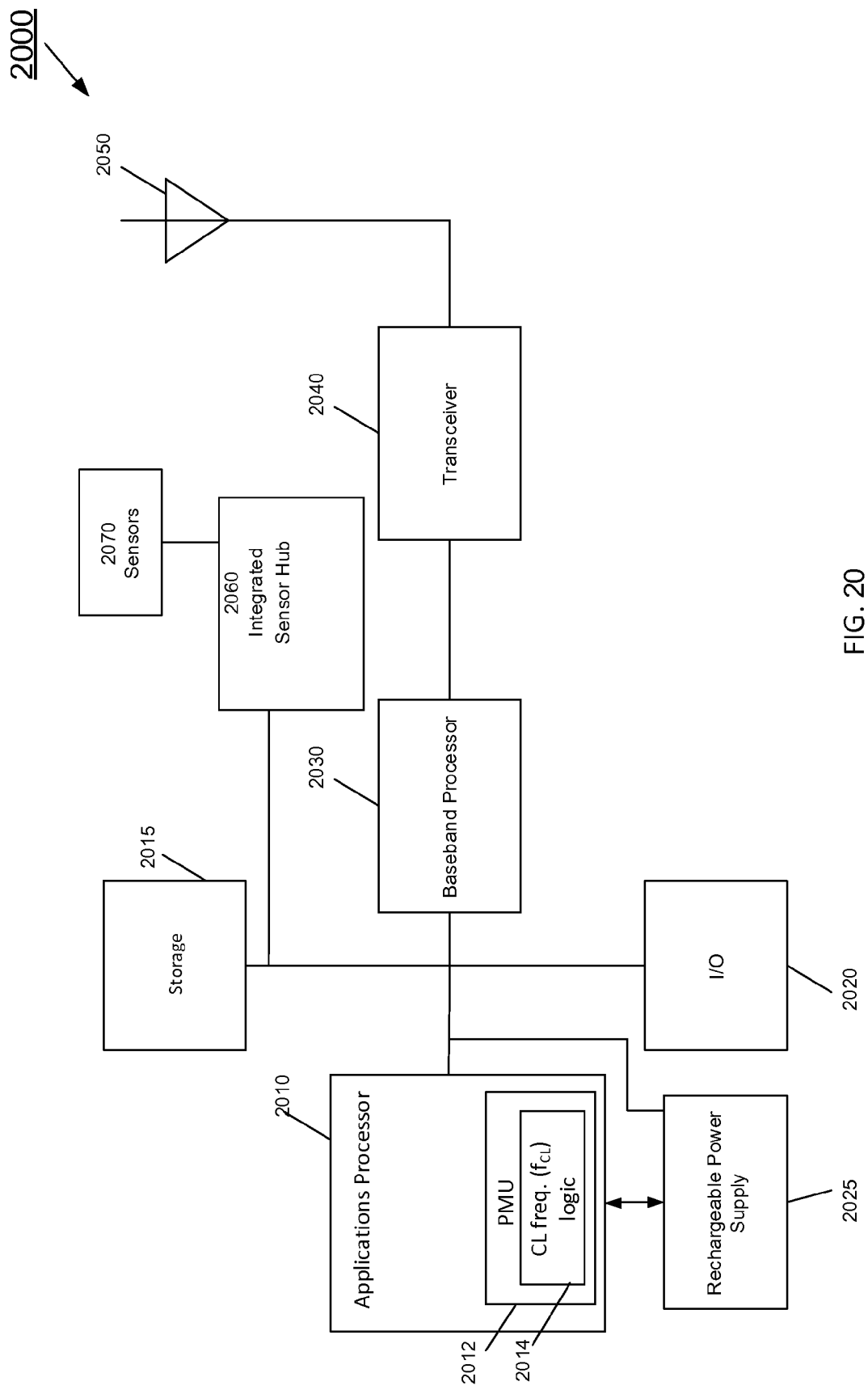
FIG. 20 is a block diagram of a system in accordance with another embodiment of the present invention.

Embodiments can be incorporated into other types of systems including mobile devices such as a cellular telephone. Referring now to FIG. 20, shown is a block diagram of a system in accordance with another embodiment of the present invention. As shown in FIG. 20, system 2000 may be a mobile device and may include various components. As shown in the high level view of FIG. 20, an applications processor 2010, which may be a central processing unit of the device, is in communication with various components including a storage 2015.

Applications processor 2010 may further be coupled to an input/output system 2020, which in various embodiments may include a display and one or more input devices such as a touch keypad, which itself can appear on the display when processed. The system 2000 may also include an integrated sensor hub (ISH) 2060 that may receive data from one or more sensors 2070. The applications processor 2010 may include one or more cores and may optionally include a graphics processing unit (not shown). The applications processor 2010 includes a power management unit (PMU) 2012 that may include communications layer frequency ($f_{CL}$) logic 2014 that is responsive to one or more changes in workload activity of the applications processor 2010 to determine whether to adjust a frequency $f_{CL}$ of a communications layer based on a Bayesian calculation, according to embodiments of the present invention. The Bayesian calculation can be based on counts of events including any of, e.g., bandwidth, memory accesses/latency, instruction stalls, cache accesses/latency, or other variables, according to embodiments of the present invention.

Applications processor 2010 also may couple to baseband processor 2030, which may condition signals such as voice and data communications for output, as well as conditioning incoming telephone and other signals. As seen, baseband processor 2030 couples to transceiver 2040, which may enable both receive and transmit capabilities. In turn, transceiver 2040 may be in communication with an antenna 2050, e.g., any type of antenna capable of transmitting and receiving voice and data signals via one or more communication protocols such as via a wireless wide area network (e.g., a 3G or 4G network) and/or a wireless local area network, such as a BLUETOOTH™ or so-called WI-FI™ network in accordance with an Institute of Electrical and Electronics Engineers 802.11 standard. As seen, system 2000 may further include a rechargeable power supply 2025 having a rechargeable battery to enable operation in a mobile environment. While shown with this particular implementation in the embodiment of FIG. 20, the scope of the present invention is not limited in this regard.

Additional embodiments are described below.

In a first example, a processor includes at least one core, an interconnect that couples the at least one core and a cache memory, the interconnect to operate at an interconnect frequency ($f_{CL}$), and a power management unit (PMU) including $f_{CL}$ logic to determine whether to adjust the $f_{CL}$ responsive to a Bayesian prediction that is associated with scalability of a workload to be processed by the processor, where the Bayesian prediction value is determined based on one or more activity measures of the processor. In an embodiment, the one or more activity measures includes a measurement associated with stalls of the at least one core. In an embodiment, the one or more activity measures includes a measurement associated with cache accesses to the cache memory. In an embodiment, the one or more activity measures include a measurement associated with memory accesses by the processor to a memory. In an embodiment, the Bayesian prediction is based at least in part on a plurality of measurements that are associated with at least two of execution stalls of the at least one core, cache accesses, and memory accesses to a memory by the processor. In an embodiment, the processor includes a phase locked loop (PLL) to generate the $f_{CL}$ and to adjust a value of the $f_{CL}$ responsive to a determination by the $f_{CL}$ control logic to adjust the $f_{CL}$.

In embodiments that may include any of the above-described features of the first example, the $f_{CL}$ logic is to determine to increase the $f_{CL}$ when the Bayesian prediction indicates that the workload is scalable.

In embodiments that may include any of the above-described features of the first example, responsive to the Bayesian prediction exceeding an increase threshold, the $f_{CL}$ logic is to increase the $f_{CL}$. In some embodiments of the first example that may include any of the above-described features of the first example, responsive to the Bayesian prediction being less than a decrease threshold, the $f_{CL}$ logic is to decrease the $f_{CL}$.

In some embodiments of the first example that may include any of the above-described features of the first example, responsive to the Bayesian prediction being approximately equal to a neutral value, the $f_{CL}$ logic is to determine that the $f_{CL}$ is to remain at a same value.

In embodiments that may include any of the above-described features of the first example, responsive to a determination by the $f_{CL}$ logic to increase the $f_{CL}$, the $f_{CL}$ is to be increased via multiplication of the $f_{CL}$ by an integer value greater than 1. In embodiments that may include any of the above-described features of the first example, responsive to a determination by the $f_{CL}$ logic to decrease the $f_{CL}$, the $f_{CL}$ is to be decreased via division of the $f_{CL}$ by an integer value greater than 1.

In a second example, a processor includes a graphics processing unit (GPU), an interconnect that is to operate at an interconnect frequency ($f_{CL}$) and that couples the GPU and a cache memory, and a power management unit (PMU) including $f_{CL}$ logic to determine whether to change the $f_{CL}$ responsive to a Bayesian prediction of scalability of a workload to be processed by the system, where the Bayesian prediction is calculated based on one or more activity measures associated with at least one of the GPU and the cache memory.

In an embodiment of the second example, the $f_{CL}$ logic is to calculate the Bayesian prediction based on stored workload characteristics associated with the GPU.

In an embodiment of the second example, the $f_{CL}$ logic may calculate the Bayesian prediction based at least in part on a measurement of cache accesses to the cache memory.

In an embodiment of the second example, the $f_{CL}$ logic is to calculate the Bayesian prediction based at least in part on a measurement of memory accesses to a dynamic random access memory (DRAM) coupled to the processor. In an embodiment that includes any of the above described features of the second example, the $f_{CL}$ logic is to determine to adjust the $f_{CL}$ in response to satisfaction of a threshold value by the Bayesian prediction. For instance, the $f_{CL}$ logic may determine to increase the $f_{CL}$ responsive to the Bayesian prediction exceeding an increase threshold. In another instance, the $f_{CL}$ logic may determine to decrease the $f_{CL}$ responsive to the Bayesian prediction being less than a decrease threshold. In another instance, responsive to a determination by the $f_{CL}$ logic to increase the $f_{CL}$, the $f_{CL}$ is to be increased via multiplication of the $f_{CL}$ by an integer value greater than 1. In another instance, responsive to a determination by the $f_{CL}$ logic to decrease the $f_{CL}$, the $f_{CL}$ is to be decreased via division of the $f_{CL}$ by an integer value greater than 1. In another instance, the $f_{CL}$ logic is to calculate the Bayesian prediction periodically and to adjust the $f_{CL}$ for each instance that the Bayesian prediction satisfies a threshold value.

In a third example, a computer readable medium stores executable instructions that, when executed by a machine, cause the machine to store one or more activity measures associated with a processor and to determine whether to adjust an interconnect frequency $f_{CL}$ of an interconnect of the processor responsive to a Bayesian prediction associated with scalability of a workload to be processed by the processor, the Bayesian prediction based on at least one of the activity measures.

In an embodiment that includes any of the above-described feature of the third example, the activity measurements associated with the processor include a count of cache read accesses and cache write accesses during a determined time period. In another embodiment, the instructions to determine whether to adjust the $f_{CL}$ include instructions to conduct a comparison of the Bayesian prediction to a threshold and to determine whether to adjust the $f_{CL}$ based at least in part on the comparison. In another embodiment, the computer readable medium additionally stores instructions to determine to increase the $f_{CL}$ responsive to the Bayesian prediction exceeding an increase threshold.

In another embodiment, the computer readable medium additionally stores instructions to determine to decrease the $f_{CL}$ responsive to the Bayesian prediction being less than a decrease threshold.

In an embodiment that includes any of the above-described features of the third example, the computer readable medium additionally stores instructions to, responsive to a determination to increase the $f_{CL}$, increase the $f_{CL}$ via multiplication of the $f_{CL}$ by an integer value greater than 1.

In an embodiment, that includes any of the above-described features of the third example, the computer readable medium additionally stores instructions to, responsive to a determination to decrease the $f_{CL}$, decrease the $f_{CL}$ via division of the $f_{CL}$ by an integer value greater than 1.

In an embodiment that includes any of the above-described features of the third example, the computer readable medium additionally stores instructions to calculate the Bayesian prediction.

In a fourth example, a method includes storing one or more activity measures associated with a processor, and determining to adjust an interconnect frequency $f_{CL}$ of an interconnect of the processor responsive to a Bayesian prediction associated with scalability of a workload to be processed by the processor, the Bayesian prediction based on at least one of the activity measures of the processor.

In an embodiment of the fourth example that includes the features described above, the method includes calculating the Bayesian prediction. In an embodiment, the activity measurements associated with the processor include a count of cache read accesses and cache write accesses during a determined time period.

In an embodiment that may include any of the above-described features of the fourth example, the method further includes determining whether to adjust the $f_{CL}$ based on a comparison of the Bayesian prediction to a threshold.

In an embodiment that may include any of the above-described features of the fourth example, the method further includes determining to increase the $f_{CL}$ responsive to the Bayesian prediction exceeding an increase threshold.

In an embodiment that may include any of the above-described features of the fourth example, the method further includes determining to decrease the $f_{CL}$ responsive to the Bayesian prediction being less than a decrease threshold.

In an embodiment that may include any of the above-described features of the fourth example, the method further includes responsive to a determination by the $f_{CL}$ logic to increase the $f_{CL}$, increasing the $f_{CL}$ via multiplication of the $f_{CL}$ by an integer value greater than 1.

In an embodiment that may include any of the above-described features of the fourth example, the method further includes responsive to a determination by the $f_{CL}$ logic to decrease the $f_{CL}$ decreasing the $f_{CL}$ via division of the $f_{CL}$ by an integer value greater than 1.

An embodiment of the fourth example is a machine-readable medium having stored thereon instructions, which if performed by a machine cause the machine to perform a method as in any of the above-described embodiments of the fourth example.

Another embodiment of the fourth example is an apparatus that includes means for performing the method as in any of the above-described embodiments of the fourth example.

Another embodiment of the fourth example is an apparatus to perform the method of any of the above-described embodiments of the fourth example.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a semiconductor die including:
at least one core;
a cache memory;
an interconnect that couples the at least one core and the cache memory, the interconnect to operate at an interconnect frequency; and
a power management unit (PMU) including first logic to determine whether to adjust the interconnect frequency responsive to a Bayesian prediction value that is associated with scalability of a workload to be processed by the processor, the Bayesian prediction value to indicate whether the workload is scalable with respect to the interconnect frequency, wherein the Bayesian prediction value is determined based on one or more activity measures associated with the processor.

2. The processor of claim 1, wherein the one or more activity measures include a measurement associated with stalls of the at least one core.

3. The processor of claim 1, wherein the one or more activity measures include a measurement associated with cache accesses to the cache memory.

4. The processor of claim 1, wherein the one or more activity measures include a measurement associated with memory accesses by the processor to a memory.

5. The processor of claim 1, wherein the Bayesian prediction value is based at least in part on a plurality of measurements that are associated with at least two of execution stalls of the at least one core, cache accesses to the cache memory, and memory accesses by the processor to a memory.

6. The processor of claim 1, wherein the first logic is to determine to increase the interconnect frequency when the Bayesian prediction value indicates that the workload is scalable.

7. The processor of claim 1, wherein the processor includes a phase locked loop (PLL) to generate the interconnect frequency and to adjust a value of the interconnect frequency responsive to a determination by the first logic to adjust the interconnect frequency.

8. A processor comprising:
a graphics processing unit (GPU);
an interconnect that couples the GPU and a cache memory, wherein the interconnect is to operate at an interconnect frequency; and
a power management unit (PMU) including control logic to determine whether to change the interconnect frequency responsive to a Bayesian prediction of scalability of a workload to be processed by the processor, the scalability of the workload with respect to the interconnect frequency, wherein the Bayesian prediction is calculated based on one or more activity measures associated with at least one of the GPU and the cache memory.

9. The processor of claim 8, wherein the control logic is to calculate the Bayesian prediction based on stored workload characteristics associated with the GPU.

10. The processor of claim 8, wherein the control logic is to calculate the Bayesian prediction based at least in part on a measurement of cache accesses to the cache memory.

11. The processor of claim 8, wherein the control logic is to calculate the Bayesian prediction based at least in part on a measurement of memory accesses to a dynamic random access memory (DRAM) coupled to the processor.

12. The processor of claim 8, wherein the control logic is to determine to increase the interconnect frequency responsive to the Bayesian prediction that exceeds an increase threshold.

13. The processor of claim 12, wherein the control logic is to determine to decrease the interconnect frequency responsive to the Bayesian prediction being less than a decrease threshold.

14. The processor of claim 8, wherein responsive to a determination by the control logic to increase the interconnect frequency, the interconnect frequency is to be increased via multiplication of the interconnect frequency by an integer value that is greater than 1.

15. The processor of claim 8, wherein responsive to a determination by the control logic to decrease the interconnect frequency, the interconnect frequency is to be decreased via division of the interconnect frequency by an integer value that is greater than 1.

16. The processor of claim 8, wherein the control logic is to calculate the Bayesian prediction periodically and to adjust the interconnect frequency for each instance that the Bayesian prediction satisfies a threshold value.

17. A non-transitory computer readable medium storing executable instructions that, when executed by a machine, cause the machine to:
store one or more activity measures associated with a processor; and
determine whether to adjust an interconnect frequency of an interconnect of the processor responsive to a Bayesian prediction associated with scalability of a workload to be processed by the processor with respect to the interconnect frequency, wherein the Bayesian prediction is determined based on at least one of the one or more activity measures of the processor.

18. The non-transitory computer readable medium of claim 17, further comprising instructions to calculate the Bayesian prediction.

19. The non-transitory computer readable medium of claim 17, wherein the activity measures associated with the processor include a count of cache read accesses and cache write accesses during a determined time period.

20. The non-transitory computer readable medium of claim 17, wherein the instructions to determine whether to adjust the interconnect frequency further comprise instructions to conduct a comparison of the Bayesian prediction to a threshold and to determine whether to adjust the interconnect frequency based at least in part on the comparison.

* * * * *